US009258573B2

(12) United States Patent
Drugeon et al.

(10) Patent No.: US 9,258,573 B2
(45) Date of Patent: Feb. 9, 2016

(54) PIXEL ADAPTIVE INTRA SMOOTHING

(75) Inventors: Virginie Drugeon, Langen (DE);
Thomas Wedi, Langen (DE); Matthias Narroschke, Langen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 387 days.

(21) Appl. No.: 12/962,125

(22) Filed: Dec. 7, 2010

(65) Prior Publication Data

US 2012/0140821 A1    Jun. 7, 2012

(51) Int. Cl.
| | | |
|---|---|---|
| H04N 7/32 | (2006.01) | |
| H04N 19/82 | (2014.01) | |
| H04N 19/105 | (2014.01) | |
| H04N 19/46 | (2014.01) | |
| H04N 19/593 | (2014.01) | |
| H04N 19/11 | (2014.01) | |
| H04N 19/117 | (2014.01) | |
| H04N 19/182 | (2014.01) | |

(52) U.S. Cl.
CPC ............ *H04N 19/82* (2014.11); *H04N 19/105* (2014.11); *H04N 19/11* (2014.11); *H04N 19/117* (2014.11); *H04N 19/182* (2014.11); *H04N 19/46* (2014.11); *H04N 19/593* (2014.11)

(58) Field of Classification Search
CPC . H04N 7/50; H04N 7/26244; H04N 7/26271; H04N 7/26015
USPC ........... 375/240.12, 240.13, 240.16; 382/232, 382/236, 239; 345/427; 714/776
IPC ...................................................... H04N 7/32
See application file for complete search history.

(56) References Cited

U.S. PATENT DOCUMENTS

| | | | | |
|---|---|---|---|---|
| 5,673,376 | A * | 9/1997 | Ray et al. ...................... 345/427 |
| 7,177,358 | B2 * | 2/2007 | Inomata et al. .......... 375/240.12 |
| 7,734,106 | B1 * | 6/2010 | Zhang et al. ................... 382/239 |
| 2005/0212974 | A1 * | 9/2005 | Michel et al. ................. 348/699 |
| 2007/0053433 | A1 * | 3/2007 | Song ........................ 375/240.13 |
| 2008/0052605 | A1 * | 2/2008 | Luo et al. ....................... 714/776 |
| 2008/0253458 | A1 * | 10/2008 | Koshiba et al. .......... 375/240.16 |

(Continued)

FOREIGN PATENT DOCUMENTS

| | | |
|---|---|---|
| EP | 2 081 386 | 7/2009 |
| EP | 2 288 163 | 2/2011 |

(Continued)

OTHER PUBLICATIONS

International Search Report issued Feb. 21, 2012 in corresponding International (PCT) Application No. PCT/EP2011/006085.
Anonymous, "Test Model under Consideration", 2. JCT-VC Meeting; Geneva; (Joint Collaborativeteam on Video Coding of ISO/IEC JCT1/SC29/WG11 and ITU-T SG. 16); URL:http: //wftp3.itu.int/av-arch/jctvc-site/, No. JCTVC-B205, XP030007704, ISSN: 0000-0046, p. 132, paragraph 9, p. 136, Jul. 28, 2010.
Marta Karczewicz, "Improved Intra Coding", 32. VCEG Meeting; 80. MPEG Meeting; San Jose; (Video Coding Experts Group of ITU-T SG. 16), No. VCEG-AF15, XP030003536, ISSN: 0000-0068, Apr. 19, 2007.

(Continued)

*Primary Examiner* — Allen Parker
*Assistant Examiner* — Long Le
(74) *Attorney, Agent, or Firm* — Wenderoth, Lind & Ponack, L.L.P.

(57) ABSTRACT

The present invention relates to spatial prediction of pixels of a block, the block being a block of a digital image. In particular, for a block pixel at least one reference pixel(s) is selected and out of the selected reference pixel(s), the block pixel is predicted. In particular, the prediction of the block pixel is performed depending on the distance of this pixel to the reference pixel(s) from which it is to be predicted.

16 Claims, 30 Drawing Sheets

(56) References Cited

U.S. PATENT DOCUMENTS

| | | | |
|---|---|---|---|
| 2009/0086814 A1* | 4/2009 | Leontaris et al. | 375/240.02 |
| 2010/0014763 A1* | 1/2010 | Wittmann et al. | 382/233 |
| 2010/0021071 A1* | 1/2010 | Wittmann et al. | 382/232 |
| 2010/0111431 A1* | 5/2010 | Gharavi-Alkhansari et al. | 382/236 |
| 2011/0038415 A1* | 2/2011 | Min et al. | 375/240.12 |
| 2011/0058611 A1* | 3/2011 | Sugimoto et al. | 375/240.16 |

FOREIGN PATENT DOCUMENTS

| | | |
|---|---|---|
| EP | 2 391 129 | 11/2011 |
| WO | 2006/020019 | 2/2006 |
| WO | 2009/136743 | 11/2009 |

OTHER PUBLICATIONS

Frank Bossen et al., "Video Coding Using a Simplified Block Structure and Advanced Coding Techniques", IEEE Transactions on Circuits and Systems for Video Technology, IEEE Service Center, Piscataway, NJ, vol. 20, No. 12, pp. 1667-1675, XP011329408, ISSN: 1051-8215, DOI: 10.1109/TCSVT.2010.2092616, Dec. 1, 2010.

S. Haykin, "Adaptive Filter Theory", Fourth Edition, pp. 94-135, Prentice Hall Information and System Sciences Series, Prentice Hall, 2002.

* cited by examiner

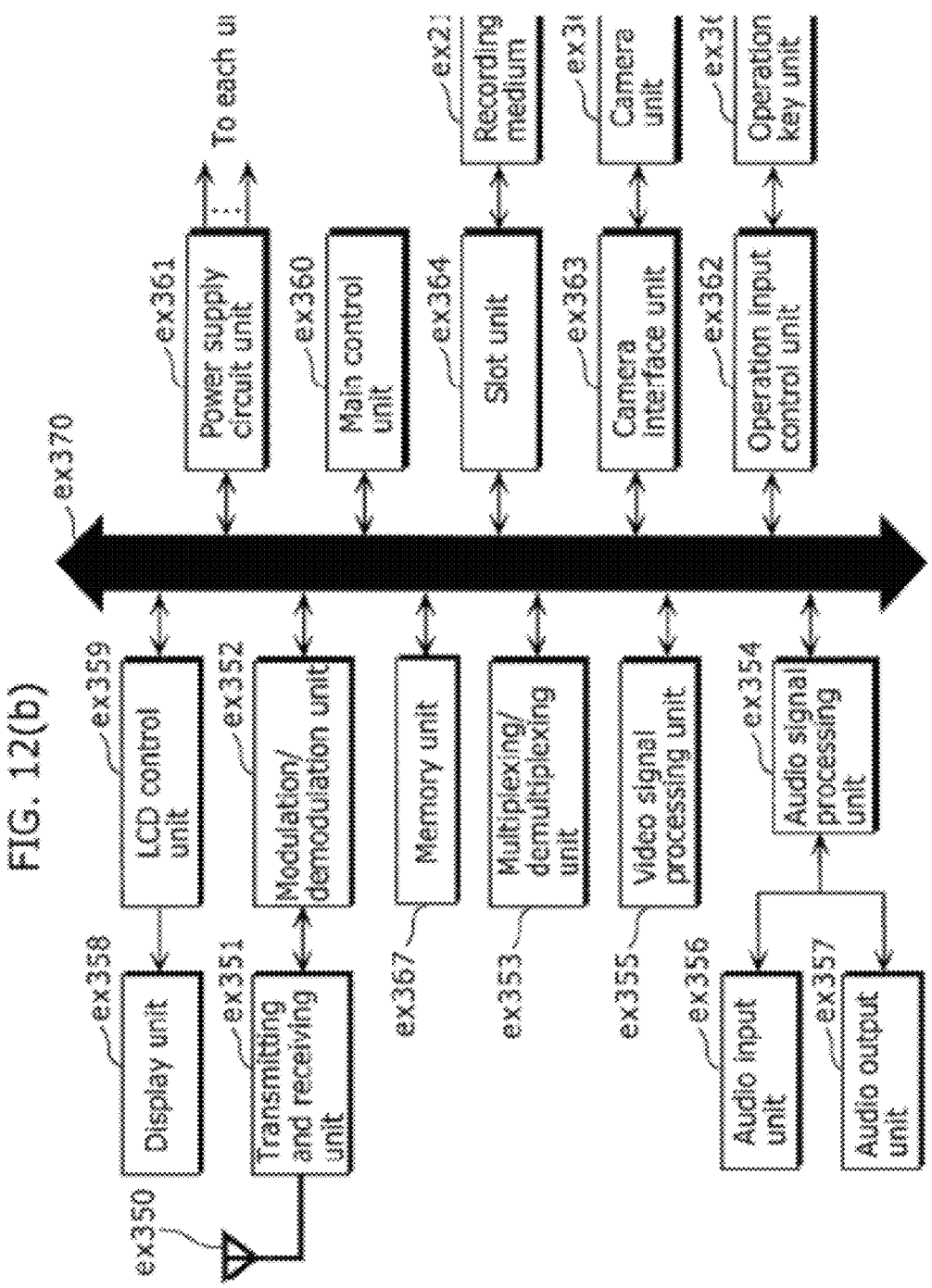

Fig. 29

| Corresponding standard | Driving frequency |
|---|---|
| MPEG4-AVC | 500MHz |
| MPEG2 | 350MHz |
| ... | ... |

PIXEL ADAPTIVE INTRA SMOOTHING

BACKGROUND OF THE INVENTION

1. Field of the Invention

The present invention relates to prediction of a block of an image. In particular, the present invention relates to spatial (intra-image) prediction of an image block.

2. Description of the Related Art

Spatial prediction has been employed in many applications. In particular, spatial prediction forms an essential part of many image and video coding and processing applications. In hybrid image or video coding algorithms, spatial prediction is typically employed for determining a prediction for an image block based on the pixels of already encoded/decoded blocks. On the other hand, spatial prediction may also be used as a part of post processing the decoded image or video signal, in particular for error concealment.

The majority of standardized video coding algorithms are based on hybrid video coding. Hybrid video coding methods typically combine several different lossless and lossy compression schemes in order to achieve the desired compression gain. Hybrid video coding is also the basis for ITU-T standards (H.26x standards such as H.261, H.263) as well as ISO/IEC standards (MPEG-X standards such as MPEG-1, MPEG-2, and MPEG-4). The most recent and advanced video coding standard is currently the standard denoted as H.264/MPEG-4 advanced video coding (AVC) which is a result of standardization efforts by joint video team (JVT), a joint team of ITU-T and ISO/IEC MPEG groups.

A video signal input to an encoder is a sequence of images called frames, each frame being a two-dimensional matrix of pixels. All the above-mentioned standards based on hybrid video coding include subdividing each individual video frame into smaller blocks consisting of a plurality of pixels. Typically, a macroblock (usually denoting a block of 16×16 pixels) is the basic image element, for which the encoding is performed. However, various particular encoding steps may be performed for smaller image elements, denoted subblocks or simply blocks and having the size of, for instance, 8×8, 4×4, 16×8, etc.

FIG. 1 is an example of a typical H.264/MPEG-4 AVC standard compliant video encoder 100. A subtractor 105 first determines differences between a current block to be encoded of an input video image (input signal) and a corresponding prediction block, which is used for the prediction of the current block to be encoded. In H.264/MPEG-4 AVC, the prediction signal is obtained either by a temporal or by a spatial prediction. The type of prediction can be varied on a per frame basis, per slice basis or on a per macroblock basis.

Macroblocks predicted using temporal prediction are called inter-encoded and macroblocks predicted using spatial prediction are called intra-encoded. The type of prediction for a video frame can be set by the user or selected by the video encoder so as to achieve a possibly high compression gain. In accordance with the selected type of prediction, an intra/inter switch 175 provides corresponding prediction signal to the subtractor 105. The prediction signal using temporal prediction is derived from the previously encoded images, which are stored in a memory 140. The prediction signal using spatial prediction is derived from the values of boundary pixels in the neighboring blocks of the same frame, which have been previously encoded, decoded, and stored in the memory 140. The memory unit 140 thus operates as a delay unit that allows a comparison between current signal values to be encoded and the prediction signal values generated from previous signal values. The memory 140 can store a plurality of previously encoded video frames. The difference between the input signal and the prediction signal, denoted prediction error signal or residual signal, is transformed resulting in coefficients, which are quantized 110. Entropy encoder 190 is then applied to the quantized coefficients in order to further reduce the amount of data in a lossless way. This is mainly achieved by applying a code with code words of variable length wherein the length of a code word is chosen based on the probability of its occurrence.

Intra-encoded images (called also I-type images or I frames) consist solely of macroblocks that are intra-encoded, i.e. intra-encoded images can be decoded without reference to any other previously decoded image. The intra-encoded images provide error resilience for the encoded video sequence since they refresh the video sequence from errors possibly propagated from frame to frame due to temporal prediction. Moreover, I frames enable a random access within the sequence of encoded video images. Intra-frame prediction uses a predefined set of intra-prediction modes. Some of the intra-prediction modes predict the current block using the boundary pixels of the neighboring blocks already encoded. Other intra-prediction modes, as template matching for example, use a search area made of already encoded pixels belonging to the same frame. The predefined set of intra-prediction modes includes some directional spatial intra-prediction modes. The different modes of directional spatial intra-prediction refer to different directions of the applied two-dimensional prediction. This allows efficient spatial intra-prediction in the case of various edge directions. The prediction signal obtained by such an intra-prediction is then subtracted from the input signal by the subtractor 105 as described above. In addition, spatial intra-prediction mode information indicating the prediction mode is provided to the entropy encoder 190 (not shown in FIG. 1), where it is entropy encoded and provided together with the encoded video signal.

In the H.264/MPEG-4 AVC intra coding scheme, the spatial prediction is performed for subblocks of sizes 4×4, 8×8 or 16×16 pixels in order to reduce spatial redundancy. Intra-frame prediction uses a predefined set of intra-prediction modes, which basically predict the current block using the boundary pixels of the neighboring blocks already coded. FIG. 3A illustrates an image block 300 with pixels p(0, 0) to p(N, M), M+1 being the number of lines of the block and N+1 being the number of columns of the block. Reference pixels p' may be used for the prediction since they belong to already encoded blocks. In particular, reference pixels 310 p'(0, −1) to p'(N, −1) and pixels 330 p'(−1, 0) to p'(−1, M) are the pixels on the top and left block's boundary, respectively. Pixels 320 p'(N+1, −1) to p'(N+1+K, −1) may also be used for the prediction, especially if the edge crossing the block is cutting them, K being the number of such pixels. In a similar way, also pixels p'(−1, M+1) to p'(−1, M+1+L) below left reference pixels 330 may be employed (not shown), L being the number of such pixels. Pixel p'(−1, −1) 340 may also be used.

The different types of directional spatial prediction refer to different directions, i.e. the direction of the applied two-dimensional extrapolation as illustrated in FIG. 3B. There are eight different directional prediction modes and one DC prediction mode for subblocks of size 4×4 and 8×8, and three different directional prediction modes and one DC prediction mode for the macroblocks of 16×16 pixels, in the standard H264/MPEG4 AVC. The future HEVC standard that is currently being developed defines up to 34 different prediction modes, including a DC mode.

FIG. 3B schematically illustrates the eight directional prediction modes used for the subblocks of 4×4 pixels in the H264/MPEG4 AVC standard. The eight prediction modes from FIG. 3B are labeled by a value 302 of range {0,1,3,4,5, 6,7,8} and associated with predictions in eight different directions 301. The remaining one prediction mode is labeled by value 2 and called "DC mode". In the DC mode, all pixels in a block are predicted by a single value, which is the mean value of the surrounding reference pixels. In the eight directional modes, the reference pixels are repeated along the corresponding directions 301. For instance, the vertical mode labeled with "0" consists in repeating vertically the reference pixels of the row immediately above the current block. The horizontal mode labeled with "1" consists in repeating horizontally the reference pixels of the column immediately to the left of the current block. The remaining modes labeled with a value from 3 to 8 are diagonal prediction modes, according to which the reference pixels are diagonally repeated in the respective diagonal direction.

Within the video encoder 100, a decoding unit is incorporated for obtaining a decoded video signal. In compliance with the encoding steps, the decoding steps include inverse quantization and inverse transformation 120. The decoded prediction error signal differs from the original prediction error signal due to the quantization error, called also quantization noise. A reconstructed signal is then obtained by adding 125 the decoded prediction error signal to the prediction signal. In order to maintain the compatibility between the encoder side and the decoder side, the prediction signal is obtained based on the encoded and subsequently decoded video signal which is known at both sides the encoder and the decoder. Due to the quantization, quantization noise is superposed to the reconstructed video signal. Due to the block-wise coding, the superposed noise often has blocking characteristics, which result, in particular for strong quantization, in visible block boundaries in the decoded image. In order to reduce these artifacts, a deblocking filter 130 is applied to every reconstructed image block.

In order to be decoded, inter-encoded images require previously encoded and subsequently decoded (reconstructed) image(s). Temporal prediction may be performed uni-directionally, i.e., using only video frames ordered in display order before the current frame to be encoded, or bi-directionally, i.e., using also video frames following the current frame in display order. Inter-encoded images called P frames can contain only blocks predicted with spatial intra prediction or unidirectional temporal prediction. Inter-encoded images called B frames can contain blocks predicted with spatial intra prediction or unidirectional temporal prediction or bidirectional temporal prediction. An inter-encoded macroblock (unidirectionally or bidirectionally predicted macroblock) is predicted by employing motion compensated prediction 160. First, a best-matching block is found for the current block within the previously encoded and decoded video frames by a motion estimator 165. The best-matching block then becomes a prediction signal and the relative displacement between the current block and its best match is signalized as motion data in the form of three-dimensional (one temporal, two spatial) motion within the bitstream comprising also the encoded prediction error or residual data. In order to optimize the prediction accuracy, motion vectors may be determined with a spatial sub-pixel resolution e.g. half pixel or quarter pixel resolution. This is enabled by an interpolation filter 150.

For both, the intra- and the inter-encoding modes, the differences between the current input signal and the prediction signal are transformed and quantized by the unit 110, resulting in quantized coefficients. Generally, an orthogonal transformation such as a two-dimensional discrete cosine transformation (DCT) or an integer version thereof is employed since it reduces the correlation of the natural video images efficiently. After the transformation, low frequency components are usually more important for image quality than high frequency components so that more bits can be spent for coding the low frequency components than the high frequency components. In the entropy coder, the two-dimensional matrix of quantized coefficients is converted into a one-dimensional array. Typically, this conversion is performed by a so-called zig-zag scanning, which starts with the DC-coefficient in the upper left corner of the two-dimensional array and scans the two-dimensional array in a predetermined sequence ending with an AC coefficient in the lower right corner. As the energy is typically concentrated in the left upper part of the two-dimensional matrix of coefficients, corresponding to the lower frequencies, the zig-zag scanning results in an array where usually the last values are zero. This allows for efficient encoding using run-length codes as a part of/before the actual entropy coding. H.264/MPEG-4 AVC employs scalar quantization 110, which can be controlled by a quantization parameter (QP) and a customizable quantization matrix (QM). One of 52 quantizers is selected for each macroblock by the quantization parameter. In addition, quantization matrix is specifically designed to keep certain frequencies in the source to avoid losing image quality. Quantization matrix in H.264/MPEG-4 AVC can be adapted to the video sequence and signalized together with the video data.

The H.264/MPEG-4 AVC includes two functional layers, a Video Coding Layer (VCL) and a Network Abstraction Layer (NAL). The VCL provides the coding functionality as briefly described above. The NAL encapsulates information elements into standardized units called NAL units according to their further application such as transmission over a channel or storing in storage. The information elements are, for instance, the encoded prediction error signal or other information necessary for the decoding of the video signal such as type of prediction, quantization parameter, motion vectors, etc. There are VCL NAL units containing the compressed video data and the related information, as well as non-VCL units encapsulating additional data such as parameter set relating to an entire video sequence, or a Supplemental Enhancement Information (SEI) providing additional information that can be used to improve the decoding performance.

In order to improve the image quality, a so-called post filter 280 may be applied at the decoder side 200. The H.264/MPEG-4 AVC standard enables sending of post filter information for such a post filter via the SEI message. The post filter information is determined at the encoder side by means of a post filter design unit 180, which compares the locally decoded signal and original input signal. In general, the post filter information is an information allowing decoder to set up an appropriate filter. It may include directly the filter coefficients or another information enabling setting up the filter. The filter information, which is outputted by the post filter design unit 180 is also fed to the entropy coding unit 190 in order to be encoded and inserted into the encoded signal.

FIG. 2 illustrates an example decoder 200 compliant with the H.264/MPEG-4 AVC video coding standard. The encoded video signal (input signal to the decoder) bitstream first passes to entropy decoder 290, which decodes the quantized coefficients, the information elements necessary for decoding such as motion data, mode of prediction etc., and the post filter information. In the entropy decoder 290, a spatial intra-prediction mode information or a motion vector information is extracted from the bitstream, indicating the type/mode of the spatial prediction or the motion data applied to the block to be decoded. The extracted information is provided to the spatial prediction unit 270 or the motion compensated prediction unit 260 (not shown in FIG. 2). The quantized coefficients are inversely scanned in order to obtain a two-dimensional matrix, which is then fed to inverse quantization and inverse transformation 220. After inverse quantization and inverse transformation, a decoded (quantized) prediction error signal is obtained, which corresponds to the differences obtained by subtracting the prediction signal from the signal input to the encoder in the case no quantization noise is introduced.

The prediction signal is obtained from either a temporal or a spatial prediction 260 and 270, respectively, which are switched 275 in accordance with a received information element signalizing the prediction applied at the encoder. The decoded information elements further include the information necessary for the prediction such as prediction type in the case of intra-prediction (a spatial intra-prediction mode information) and motion data in the case of motion compensated prediction. Depending on the current value of the motion vector, interpolation of pixel values may be needed in order to perform the motion compensated prediction. This interpolation is performed by an interpolation filter 250. The quantized prediction error signal in the spatial domain is then added by means of an adder 225 to the prediction signal obtained either from the motion compensated prediction 260 or intra-frame prediction 270. The reconstructed image may be passed through a deblocking filter 230 and the resulting decoded signal is stored in the memory 240 to be applied for temporal or spatial prediction of the following blocks. The post filter information may be fed to a post filter 280, which sets up a post filter accordingly. The post filter is then applied to the decoded signal in order to further improve the image quality.

FIG. 4 illustrates intra prediction of a block 410 of an original image with an edge. The edge enters the block 410 on the top and curves smoothly to the right. A prediction signal for the block 410 is obtained by extrapolating the available reference pixels. In FIG. 4, the block to be predicted 420 can be predicted by using a vertical prediction mode (mode number 0 of FIG. 3B) since the edge is vertical in the upper part of the original block. The entering edge is thus prolonged through the block. This prediction signal differs from the original image block since the edge is not curved to the right. The prediction error 440 is given by the difference between the original image block and the prediction block. As can be seen from the figure, the prediction error 440 itself represents an edge which may be rather sharp, meaning that the prediction error block 440 will contain high frequency coefficients after a transformation into a domain of spatial frequency. Thus, the transform coding and the subsequent quantization shall have a reduced efficiency and the resulting coded signal shall require higher rate for the transmission.

SUMMARY OF THE INVENTION

Given these problems with existing technology, it would be advantageous to provide a more efficient intra prediction.

It is the particular approach of the present invention to predict the pixels of an image block by applying filtering to reference pixel(s), wherein for an image block pixel the characteristics of the filter depends on the distance of the pixel from the reference pixel(s) used for its prediction.

In accordance with a first aspect of the present invention, a method is provided for predicting pixels of an image block in a digital image based on reference pixels adjacent to said image block. The method comprises determining for a pixel of the image block at least one reference pixel adjacent to said block, and predicting said pixel of the image block by applying filtering to said determined at least one reference pixel, wherein the filter characteristics depend on the distance of said pixel of the image block to said at least one reference pixel.

In accordance with a second aspect of the present invention an apparatus is provided for predicting pixels of an image block in a digital image based on reference pixels spatially adjacent to said image block, the apparatus comprising: a reference determining unit for determining for a pixel of the image block at least one reference pixel adjacent to said block; and a predictor for predicting said pixel of the image block by applying filtering to said determined at least one reference pixel, wherein the filter characteristic depends on the distance of said pixel of the image block to said at least one reference pixel.

BRIEF DESCRIPTION OF THE DRAWINGS

The accompanying drawings are incorporated into and form a part of the specification to illustrate several embodiments of the present invention. These drawings together with the description serve to explain the principles of the invention. The drawings are only for the purpose of illustrating preferred and alternative examples of how the invention can be made and used, and are not to be construed as limiting the invention to only the illustrated and described embodiments. Further features and advantages will become apparent from the following and more particular description of the various embodiments of the invention, as illustrated in the accompanying drawings, in which like reference numbers refer to like elements and wherein:

FIG. 17B is a block diagram showing an example of a configuration of the cellular phone;

FIG. 29 is a schematic drawing showing an example of a look-up table in which the standards of video data are associated with the driving frequencies;

DETAILED DESCRIPTION OF THE INVENTION

Figure 3B:
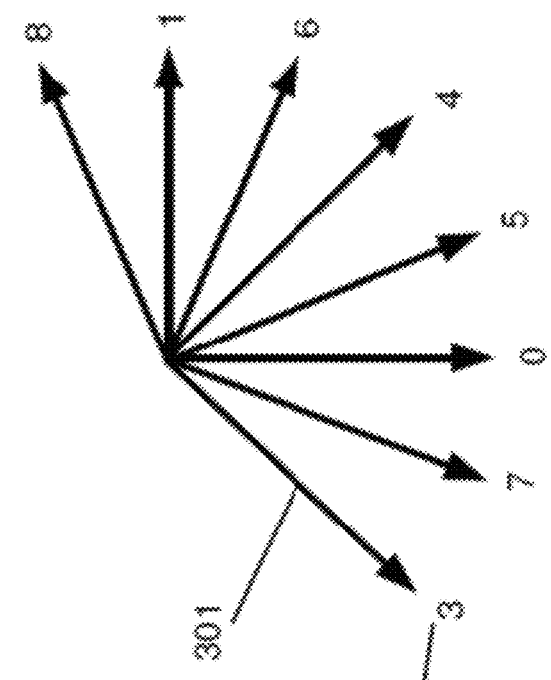
FIG. 3B is a schematic drawing illustrating the directions of the spatial directional prediction modes employed in the spatial prediction of H.264/MPEG-4 AVC video coding and decoding.
Figure 4:
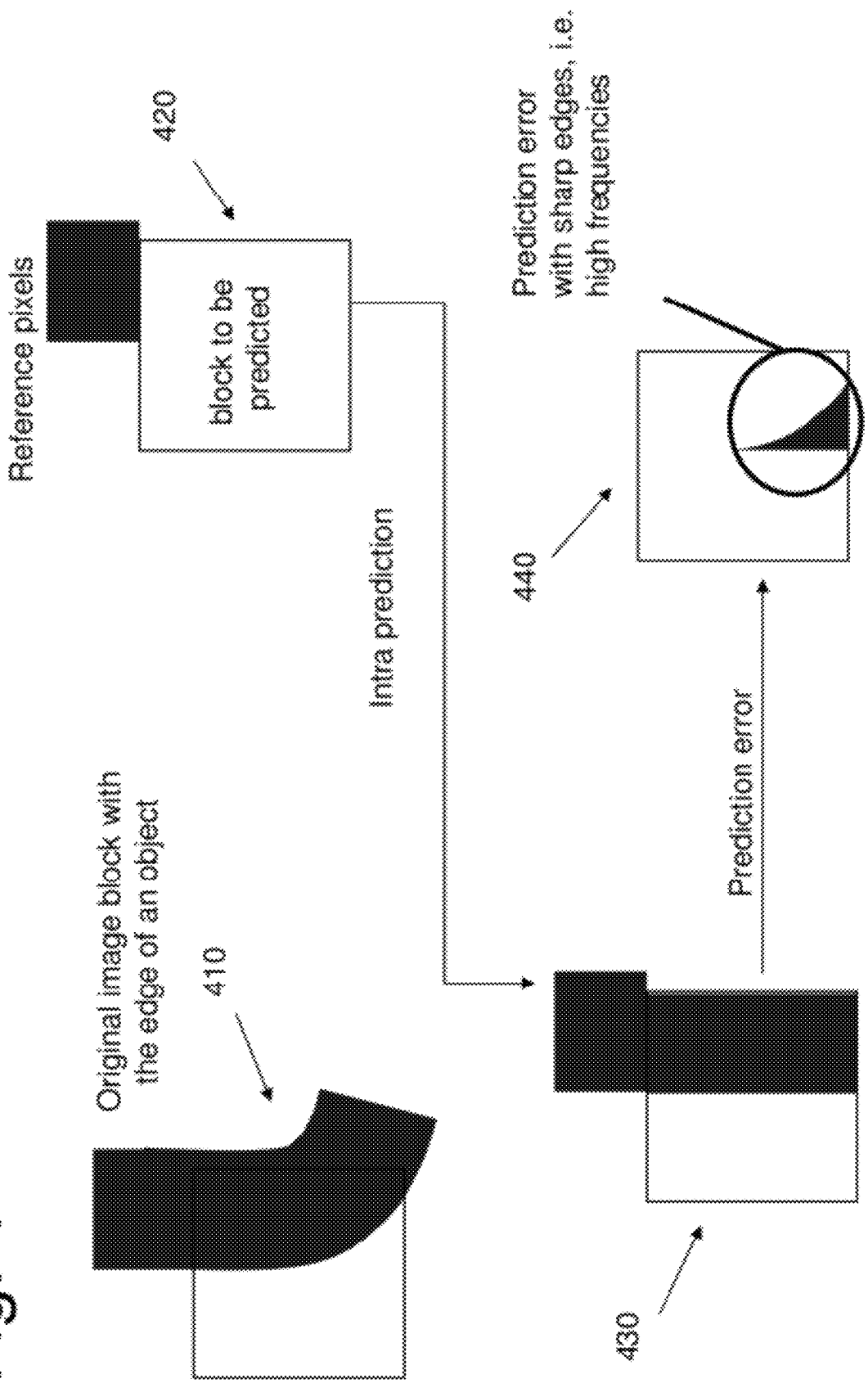
FIG. 4 is a schematic drawing illustrating the steps of intra prediction for an exemplary image block with an edge.

As can be seen from FIG. 4, the prediction error of intra prediction may include high frequency coefficients which are expensive to encode in terms of bitrate or distortion. This is, in particular, the case for any non-linear edges or edges which do not match one of the predefined prediction directions (such as the ones from FIG. 3B).

Figure 3A:
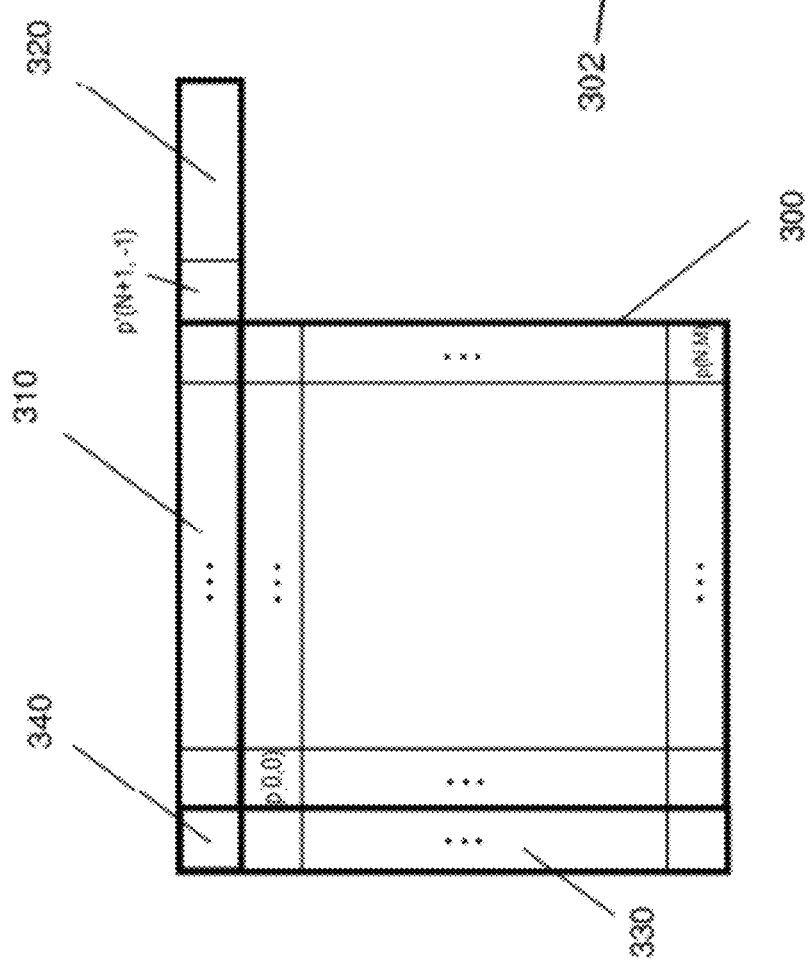
FIG. 3A is a schematic drawing illustrating pixels of an image block and the adjacent pixels.

In order to remove high frequencies from the prediction signal of intra coding, it is advantageous to apply a low-pass filter on the reference pixels before performing intra prediction. FIG. 3A shows a block 300 of size (N+1)×(M+1) with pixels p(0, 0) to p(N, M), the top reference pixels p'(0, −1) to p'(N, −1) located on the top of the block 300, the top left reference pixel p'(−1, −1) and the left neighbouring reference pixels p'(−1, 0) to p'(−1, M). In addition, for the prediction, the available pixels to the right of the pixels 310 may be used, namely, pixels p'(N+1, −1) and p'(N+1+K, −1). The notation p with the apostrophe emphasizes that p' is a pixel available as a reference pixel for the prediction, meaning that it is already encoded (in case the prediction is applied at the encoder side) or decoded (in case the prediction is applied at the decoder side). In order to reduce high frequencies from the prediction signal, the row (pixels on the top of the block) or the column (pixels to the left of the block) of reference pixels may be filtered in a pre-processing step before calculating the prediction. Such filtering may be for instance, a smoothing operation which corresponds to applying a finite impulse response (FIR) filter with a low-pass characteristics or any other low pass filter. The application/non-application of such a smoothing filter is advantageously indicated within the encoded bit stream for a particular block or for a slice, frame, GoP or sequence.

The above example refers to the top and left reference pixels since it is assumed that the blocks are processed in a raster scanning order, i.e. from left to right and row-wisely from top to bottom. However, for other scanning orders, which may be given for instance by a different slicing modes, other reference pixels may be available and used. For instance, reference pixels to the right and/or on the bottom of the block may be employed for the prediction. In general, it is advantageous to use the pixels already encoded and reconstructed at the encoder side in order to enable the same prediction at the decoder side, based on already decoded pixels.

Figure 5:
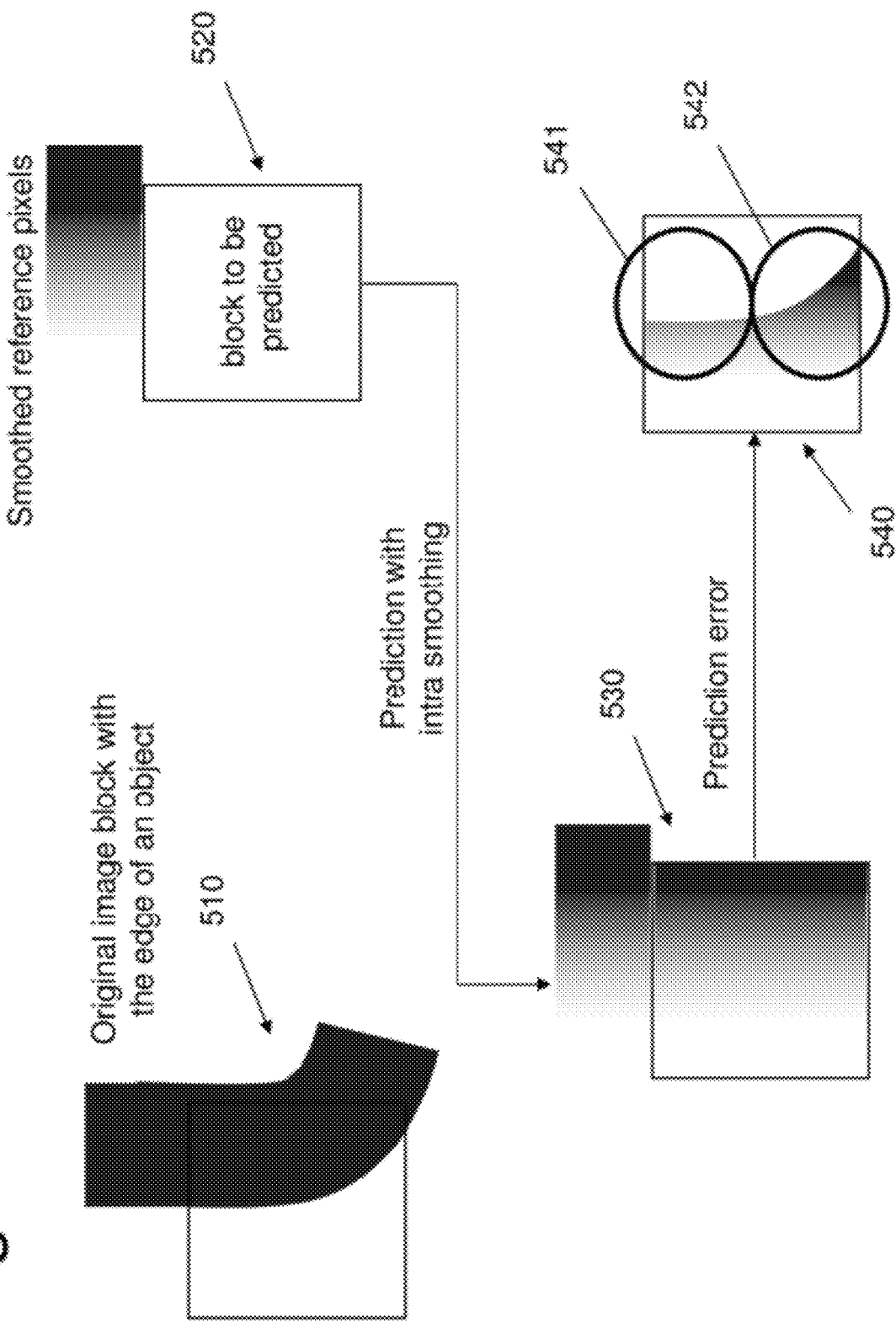
FIG. 5 is a schematic drawing illustrating intra prediction applying intra smoothing of reference pixels.

FIG. 5 illustrates prediction of pixels in a block based on the available smoothed reference pixels. The original image block 510 corresponds to the original image block 410 from the example described with reference to FIG. 4. An edge enters the block on the top and is curved within the block to the right.

The prediction mode can be selected based on the reference pixels and/or other pixels in the block's neighbourhood. For instance, an edge detection may be performed and since a vertical edge is detected, the vertical prediction is selected. Another possibility is to perform prediction according to all predefined prediction modes and to select the one providing the lowest difference to the original or providing the lowest distortion cost.

Before the actual prediction (extrapolation of block pixels from reference pixels) takes place, the top reference pixels above the block to be predicted 520 are smoothed with a low pass filter. The prediction is then performed based on the smoothed reference pixels. The predicted pixels of the block 530 follow the smooth transition in horizontal direction based on the smoothed reference pixels. The prediction error block 540 is a difference between the original image block 510 and the prediction block 530. The prediction error block 540 has prediction error with less high frequency coefficients in the lower part 542 of the block, compared to the prediction error 440 shown in FIG. 4. However, a non-zero prediction error 541 can be seen in the upper part of the prediction block 540. Thus, intra smoothing of the reference pixels before the prediction reduces higher frequency coefficients in the prediction error, however, the prediction error may, in general, be higher as can be seen by comparison of the prediction error block 440 and the prediction error block 540.

Figure 6:
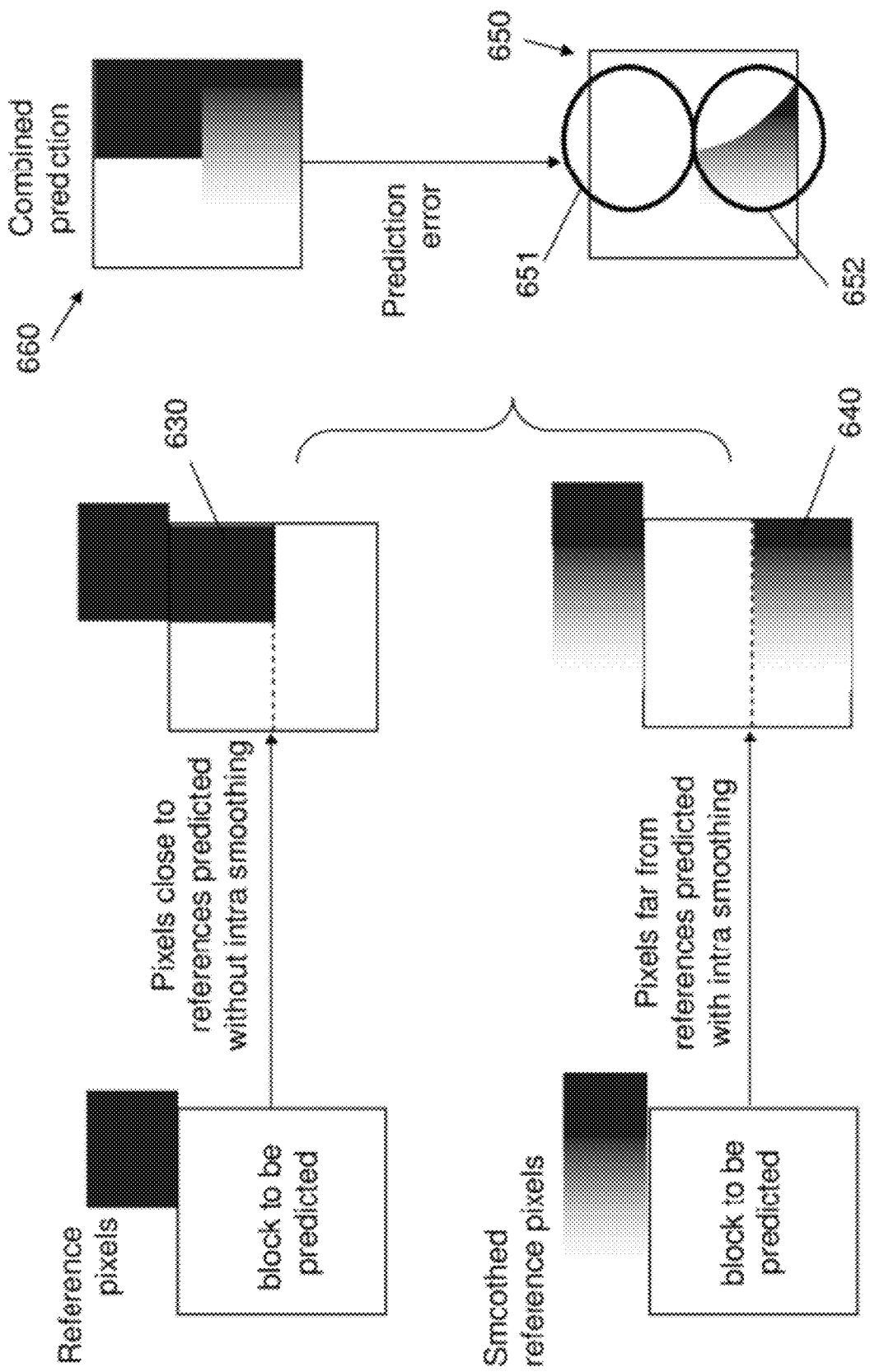
FIG. 6 is a schematic drawing illustrating intra prediction employing a pixel adaptive intra smoothing according to an embodiment of the present invention.
Figure 7:
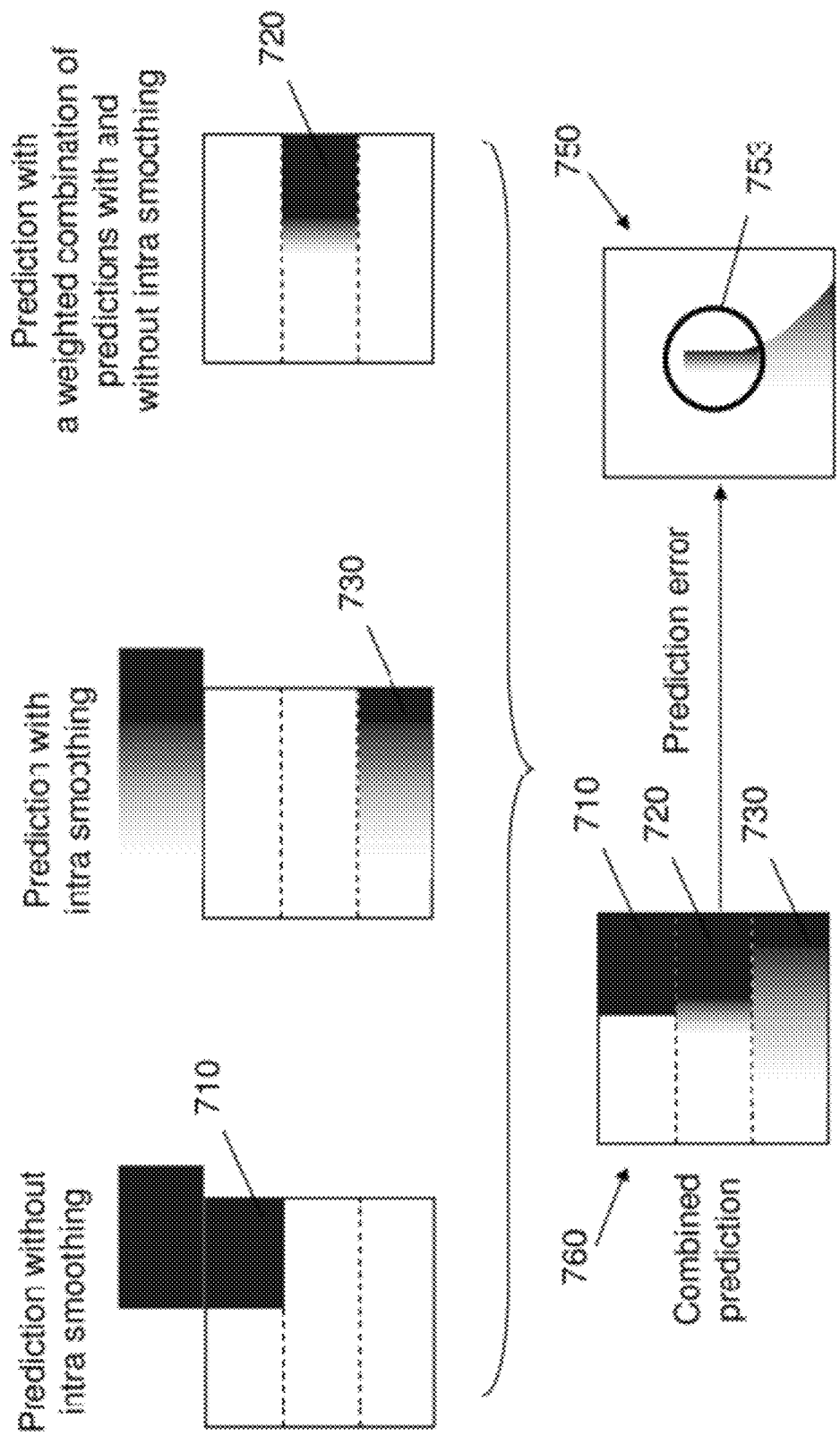
FIG. 7 is a schematic drawing illustrating intra prediction applying a pixel adaptive weighted intra smoothing in accordance with another embodiment of the present invention.

It should be noted that the prediction blocks and prediction error blocks in FIGS. 4 to 7 are intended for better understanding of the present invention. They are merely illustrational and do not correspond to real calculated prediction values. In particular, the prediction error signals 540, 650 and 750 could not be correctly represented as they contain negative values that are not present in the figures. The purpose of these figures is only to visualize the problems and principles of the prior art approach (FIGS. 4 and 5) and the approach of the present invention (FIGS. 6 and 7).

The efficiency of intra smoothing depends on the contents of the block to be predicted. Therefore, it may be advantageously signalled whether the prediction samples are to be filtered or not. The smoothing decision may be performed by a rate-distortion (RD) optimization algorithm which compares the results of filtered and unfiltered prediction samples. It is also possible to apply the intra smoothing only to certain intra prediction modes. However, additional information to be transmitted, such as a flag indicating whether the smoothing is to be applied or not, may reduce the efficiency of the image coding.

As can be seen from FIG. 5, intra smoothing may worsen the results of the prediction for the pixels close to the reference pixels. On the other hand, intra smoothing improves the results of intra prediction for the pixels of the block located at a higher distance from the reference pixels. This is caused by the fact that the pixels of the block close to the reference pixels have a higher correlation with the reference pixels. Moreover, the prediction error signal contains less high frequencies.

Therefore, according to an advantageous embodiment of the present invention, the use of the prediction with or without intra smoothing of the reference pixels is made pixel dependant. Particularly, the dependency is controlled by the distance of the pixel to predict to the corresponding reference pixel. The pixels of the block, which are close to the reference pixels, are predicted without applying a smoothing filter to the reference pixels. On the other hand, the pixels of the block far from the reference pixels are predicted using the smoothed reference pixels. This approach provides the advantage of reference pixels smoothing, namely, reduction of higher frequency coefficients in the prediction error for the pixels, which are located far from the reference pixels, and which are thus less correlated with the reference pixels. On the other hand, the prediction of pixels located close to the reference pixels is more accurate when using the non-filtered reference pixels. Accordingly, an increased coding efficiency is achievable.

An example of such an adaptive intra smoothing is shown in FIG. 6. In this example, the original block is the same as in FIGS. 4 and 5: original block 410 and 510 with the edge of an object. In FIG. 6, the block to be predicted is sub-divided into two prediction regions. The region closest to the reference pixels is predicted using non-filtered reference pixels whereas the remaining region is predicted using the smoothed reference pixels. In this example, the same block to be predicted, the same reference pixels to be used and the same vertical prediction mode as in the previous examples described with reference to FIGS. 4 and 5 are assumed. The upper part of the block to be predicted 630 is the part closer to the reference pixels which are to be used for the intra prediction. In this case, vertical prediction is to be performed and consequently, upper reference pixels are to be used. The upper part 630 of the prediction block thus corresponds to the upper part of the prediction block 430 of FIG. 4. Since the edge is vertical and does not curve in the upper part of the block, the prediction corresponds to the original image block and the prediction error 651 is zero.

For predicting the lower part of the block, smoothed reference pixels are employed. In particular, the lower part 640 of the prediction block has a smooth transition corresponding to the smoothed reference pixels. In accordance with this embodiment of the present invention, the prediction block 660 is a combination of the upper part 630 predicted from the unfiltered reference pixels and the lower part 640 predicted using the smoothed reference pixels. The prediction error block 650 is therefore also composed of two prediction error regions, namely, the prediction error 651 of the upper part which is zero and the prediction error 652 of the lower part of the prediction block 650 with less high frequency coefficients. As can be seen in FIG. 6, the prediction error block 650 enables employing the more exact prediction close to the reference pixels and employing smoothed reference pixels for the prediction of the remaining pixels in order to suppress high frequency coefficients possibly present due to a lower correlation with the reference pixels.

This example illustrates prediction based on a vertical intra prediction direction for a particular block containing a vertical edge entering the block on its top. However, the present invention is not limited thereto and the combined prediction using smoothed reference pixels and non-smoothed reference pixels is applicable to any other intra prediction direction. Accordingly, the top reference pixels and/or the left reference pixels may be smoothed depending on the direction of the prediction to be performed.

The example described with reference to FIG. 6 sub-divided the block to be predicted into two prediction regions according to the distance of the pixels to the reference pixels used for their prediction. A first region is predicted using the non-filtered reference pixels whereas a second region is predicted using low-pass filtered reference pixels. One possibility to define the regions is to calculate a distance value for each pixel of the block to be predicted and compare this distance value to a predetermined distance threshold.

FIG. 7 illustrates another example in accordance with another advantageous embodiment of the present invention, which sub-divides a block to be predicted into three prediction regions. Pixels of a first region are predicted using the unfiltered reference pixels. The first region is a region in the proximity of the reference pixels. A third region is predicted from the intra smoothed reference pixels. The third region is preferably the region farthest from the reference pixels. A second region is predicted as a weighted combination of a prediction with intra smoothed reference pixels and a prediction using the unfiltered reference pixels. In FIG. 7, the same reference pixels, block to be predicted and vertical prediction mode as in the previous examples are assumed. The prediction block 760 is composed of the first region 710, the second region 720, and the third region 730. The prediction error block 750 includes a first part corresponding to the first region 710 with a prediction error zero. It further includes a second part corresponding to the second region of the prediction block with a prediction error 753. Finally, the prediction error of the third part corresponds to the third prediction region 730 of the prediction block. The intra prediction scheme according to the examples described with reference to FIGS. 6 and 7 may be, in general, employed by any of the prediction modes. Accordingly, the block to be predicted is sub-divided into several regions according to the distance of the pixels in the respective regions to the pixels used as reference for their prediction. Generally, N prediction regions may be defined using a distance value for each pixel to be predicted and N−1 distance thresholds as explained previously for two prediction regions.

However, the results, i.e. the prediction error will also depend on the content of the block to be predicted. Therefore, it may be advantageous to combine the prediction from unfiltered reference pixels and the prediction from smoothed reference pixels in a more flexible way. In order to facilitate this, according to another advantageous embodiment of the present invention, a matrix of weights is transmitted at the sequence level, at the level of the group of pictures, at the frame level or at slice level. The group-of-pictures level means that the matrix of weights is transmitted once for each I-frame whereas the following P/B frames use a matrix from the closest previous I-frame.

An exemplary matrix of weights has the following form:

$$W = \begin{pmatrix} x & \cdots & \cdots & \cdots & \cdots & \cdots & \cdots & x & w_{N;-N} \\ \vdots & \ddots & & & & & & x & \vdots \\ \vdots & & \ddots & & & x & w_{2;-2} & \cdots & w_{N;-2} \\ \vdots & & & \ddots & x & w_{1;-1} & w_{2;-1} & \cdots & w_{N;-1} \\ \vdots & & & x & x & w_{1;0} & w_{2;0} & \cdots & w_{N;0} \\ \vdots & & x & w_{-1;1} & w_{0;1} & w_{1;1} & \cdots & \cdots & w_{N;1} \\ \vdots & x & w_{-2;2} & w_{-1;2} & w_{0;2} & \vdots & \ddots & & \vdots \\ x & \cdot^{\cdot^{\cdot}} & \vdots & \vdots & \vdots & & & \ddots & \vdots \\ w_{-N;N} & \cdots & \cdots & w_{-1;N} & w_{0;N} & w_{1;N} & \cdots & \cdots & w_{N;N} \end{pmatrix}$$

wherein the values marked as "x" are not used for prediction and are therefore not transmitted. The values marked as x are in the top left corner of the matrix and represent distances that are not applicable for prediction as the pixels on the right of and below the blocks to be predicted are not available as reference pixels. However, if such reference pixels were made available by a different block scanning order in the image, the matrix of weights would have to be adapted accordingly. Each element $w_{i,j}$ represents a weight to be applied for predicting a pixel with the horizontal distance i and vertical distance j from the corresponding reference pixel. In other words, each weight of the matrix corresponds to a distance between two pixels, namely, distance between the pixel to be predicted and an already reconstructed reference pixel used for the prediction. The size of the matrix of weights in this example is (2N+1)×(2N+1) with N being the size of the maximum prediction unit (PU). For instance, let us assume that the maximum PU size is 32, meaning that the maximum size of a block, for which the intra prediction is applied, is 32×32 pixels. The weights $w_{i,j}$ may be used to predict all the pixels for blocks of size 32×32 or smaller:

However, a matrix smaller than (2N+1)×(2N+1) with N being the size of the maximum PU may also be defined. For instance, if the block is larger than 32×32 pixels, the matrix's weights are used to predict the pixels having a distance to reference pixels that is covered by the matrix, i.e. distance in the range [−32,32] pixels in vertical and horizontal direction. For the other pixels, the distance of which is larger than defined in the matrix, the weight of zero may be used, which corresponds to predicting the pixel with smoothed reference pixels.

The main advantage of the above described "distance matrix" W is its universal applicability to different sizes of blocks. The distance matrix is also universal for all possible prediction modes. Thus, it may be signalled efficiently. The present invention is also not limited by the ways in which matrix W may be adapted to the content of the sequence, GoP, image, slice or block. However, the distance matrix may also be fixed at the encoder and the decoder.

Figure 8:
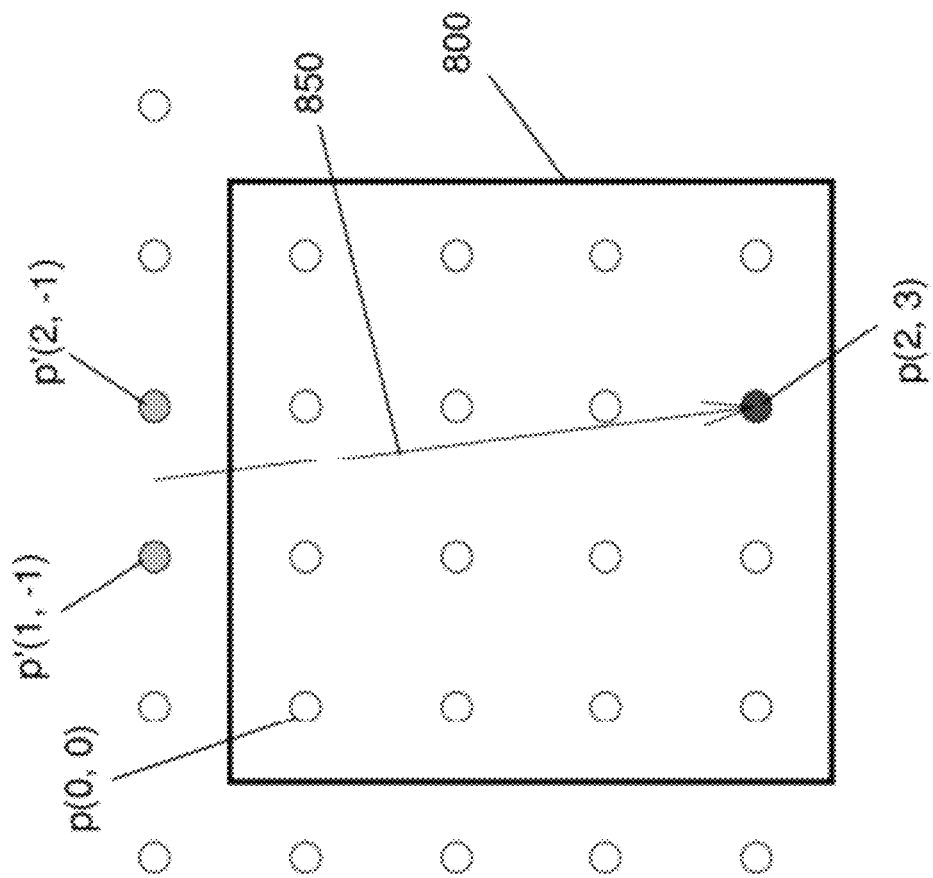
FIG. 8 is a schematic drawing illustrating intra prediction of a pixel.

FIG. 8 illustrates an example of predicting a pixel p(2, 3) of a 4×4 large image block 800. The image block 800 consists of pixels p(i, j) to be predicted, wherein i and j are the column and the row indices, respectively. In the figure, pixel p(0, 0) is in the top left corner of the block 800. In this example, it is assumed that a pixel p(2, 3) is to be predicted using two available (already reconstructed/decoded) pixels on the top boundary of the block 800, namely, pixels p'(1, −1) and p'(2, −1). In accordance with directional prediction using the unfiltered reference pixels p'(1, −1) and p'(2, −1) a prediction of pixel p(2, 3) is given by $$\text{pred}_{NS}[p(2,3)] = \alpha^* p'(1,-1) + \beta^* p'(2,-1)$$

wherein α and β are weighting coefficients advantageously depending on the direction of the prediction, in particular on a distance between each of the pixels p'(1, −1) and p'(2, −1) from a line crossing pixel p(2, 3) to be predicted and having a slope defined by the direction of the prediction. Similarly, prediction of pixel p(2, 3) using the smoothed reference pixels is given by:

$$\text{pred}_S[p(2,3)] = \alpha^* p'_S(1,-1) + \beta^* p'_S(2,-1),$$

wherein $p'_S(1, -1)$ and $p'_S(2, -1)$ represent the smoothed reference pixels.

According to an advantageous embodiment of the present invention, the prediction of the pixel p(2, 3) is a combination of $\text{pred}_{NS}[p(2,3)]$ and $\text{pred}_S[p(2,3)]$, the coefficient for said combination being obtained from the matrix of weights W (here called "distance matrix"). The coefficients α and β are depending on the distance of an edge, going through the pixel p(2, 3) to be predicted and having a slope of the direction along which the prediction is performed, to the two reference pixels p'(1, −1) and p'(2, −1). Therefore, the closest of these two reference pixels is used to determine the weight $w_{i,j}$ to be applied. In particular, the prediction of pixel p(2, 3) is given by:

$$\text{pred}[p(2,3)] = w_{1;4}\text{pred}_{NS}[p(2,3)] + (1-w_{1;4})\text{pred}_S[p(2,3)] \text{ if } \alpha > \beta$$

$$\text{pred}[p(2,3)] = w_{0;4}\text{pred}_{NS}[p(2,3)] + (1-w_{0;4})\text{pred}_S[p(2,3)] \text{ otherwise}$$

The weight $w_{1;4}$ is applied because the horizontal distance of pixel p(2, 3) to the reference pixel p'(1, −1) is equal to 1 and the vertical distance is equal to 4. The weight $w_{0;4}$ is applied because the horizontal distance of pixel p(2, 3) to the reference pixel p'(2, −1) is equal to 0 and the vertical distance is equal to 4. Generally, the distance to the reference pixel having the maximum weight (α or β) in $\text{pred}_{NS}[p(x, y)]$ and $\text{pred}_S[p(x, y)]$ is advantageously taken.

Summarising, according to an advantageous embodiment of the present invention, in order to determine the weight to be applied for prediction of each pixel, the distance between the pixel to be predicted and a reference pixel used for its prediction is exploited. The weight is applied to combine the prediction value obtained with smooth references and with non-smooth references.

For instance, one possible distance matrix $W^{(bin)}$ of weights corresponding to the example described with reference to FIG. 6, is given by:

$$W^{(bin)} = \begin{pmatrix} x & \cdots & \cdots & \cdots & \cdots & \cdots & \cdots & \cdots & \cdots & x & 0 \\ \vdots & \ddots & & & & & & & & \cdot^{\cdot^{\cdot}} & \vdots \\ \vdots & & \ddots & & & & & & \cdot^{\cdot^{\cdot}} & 0 & \vdots \\ \vdots & & & \ddots & & & & \cdot^{\cdot^{\cdot}} & 1 & 0 & \vdots \\ \vdots & & & & \ddots & & x & \cdot^{\cdot^{\cdot}} & \vdots & \vdots & \vdots \\ \vdots & & & & & \ddots & x & 1 & \cdots & 1 & 0 & \cdots & 0 \\ \vdots & & & & & x & x & 1 & \cdots & 1 & 0 & \cdots & 0 \\ \vdots & & & & x & 1 & 1 & \ddots & & \vdots & \vdots & & \vdots \\ \vdots & & & \cdot^{\cdot^{\cdot}} & \cdot^{\cdot^{\cdot}} & \vdots & \vdots & & \ddots & \vdots & \vdots & & \vdots \\ \vdots & & \cdot^{\cdot^{\cdot}} & 1 & \cdots & 1 & 1 & \cdots & \cdots & 1 & 0 & \cdots & 0 \\ \vdots & \cdot^{\cdot^{\cdot}} & 0 & 0 & \cdots & 0 & 0 & \cdots & \cdots & 0 & \cdots & \cdots & 0 \\ x & \cdot^{\cdot^{\cdot}} & & \vdots & & \vdots & \vdots & & & \vdots & \ddots & & \vdots \\ 0 & \cdots & \cdots & \cdots & \cdots & 0 & 0 & \cdots & \cdots & 0 & \cdots & \cdots & 0 \end{pmatrix}$$

As in previous general matrix W, values marked as x are not applicable. In matrix $W^{(bin)}$ the weights up to a given distance are equal to one, whereas all other weights are equal to zero. Thus, this matrix only specifies up to which distance the unfiltered reference pixels are to be used for the prediction and from which distance the reference pixels are to be filtered before the prediction.

According to another exemplary embodiment of the present invention, such an information may be transmitted in a more efficient way, namely, as a distance limit D. Distance limit D specifies up to which distance the unfiltered reference pixels are going to be used and from which distance the reference pixels are to be smoothed for the purpose of predicting the block's pixels. For example, if the pixel p(x,y) of the block is predicted using as reference the already reconstructed pixel p'(i,j), the distance value may be $d=|x-i|^2+|y-j|^2$. The pixels with a distance value such that d<D may be predicted using the unfiltered reference pixels, while the rest of the pixels may be predicted using smoothed references. However, the distance limit D may alternatively be set for other distance metrics such as, for instance, min(x−i, y−j). Obviously, other metrics for expressing the distance between reference pixels and pixels to be predicted, may be applied and thresholded by distance limit D, without departing from the idea of the present invention.

The above described exemplary matrix $W^{(bin)}$ with binary weights is particularly advantageous in view of the signalling overhead, since it does not require a high bandwidth. Moreover, since it merely consists of zeros and ones, it may be further efficiently compressed, for instance by a run-length coding or an entropy coding. However, the setting of weights in this way results in subdividing the block to be predicted sharply into two regions to which different reference pixels apply.

In order to set the weights of the matrix W in a finer way, the weights may be defined as $$W = \frac{R}{r_{0;0}}$$

wherein $$R = \begin{pmatrix} r_{-N;N} & \cdots & & & & \cdots & r_{N;-N} \\ \vdots & \ddots & & & & \ddots & \vdots \\ \vdots & & r_{-1;-1} & r_{0;-1} & r_{1;-1} & & r_{N;-1} \\ \vdots & & r_{-1;0} & r_{0;0} & r_{1;0} & \cdots & r_{N;0} \\ \vdots & & r_{-1;1} & r_{0;1} & \ddots & & \vdots \\ \vdots & \ddots & \vdots & \vdots & & \ddots & \vdots \\ r_{-N;N} & \cdots & r_{-1;N} & r_{0;N} & \cdots & \cdots & r_{N;N} \end{pmatrix}$$

with $$r_{i;j} = \sum_{x,y} p(x,y) p(x+i, y+j).$$

Here, R is an autocorrelation matrix of the image signal. Indices x, y, i, and j are indices of original pixel p within the image. The autocorrelation matrix may be estimated based one whole image and the weights of matrix W may be designed accordingly once. However, the estimation of the autocorrelation matrix may be regularly updated based on recently coded image/video portions.

Such a weighting matrix enables full flexibility of setting the weights adaptively considering the content of the image. Such a weighting matrix could be signalled from the encoder to the decoder and embedded within the encoded bit stream. Alternatively, the correlation matrix can be signalled and the distance matrix may be derived based thereon at the decoder. Alternatively, the auto correlation of the image may be estimated from the reconstructed parts of the image rather than from the original image, in the same way at the encoder and the decoder. For example, the auto correlation of already reconstructed pixels belonging to a window around the current block to be predicted could be calculated in the same way at encoder and decoder side and used for the prediction of the current block. This solution provides a better local adaptation of the distance matrix even if the statistics are less accurate as they are derived from coded pixels instead of original pixels. Generally, such estimation shall be less accurate and thus provide a lower quality of the prediction. On the other hand, no further signalling is necessary to derive the same distance matrix at the encoder and the decoder.

The matrix of weights exemplified above can be used if the pixels 320 located to the right from the top reference pixels and/or the pixels located below the left reference pixels 330 are considered. However, if only the pixels above 310, above left 340 and left 330 from FIG. 3A are used for prediction, a smaller matrix may be employed, which can have the form of:

$$W^{(b)} = \begin{pmatrix} x & w_{1;0} & \cdots & w_{N;0} \\ w_{0;1} & w_{1;1} & & \vdots \\ \vdots & & \ddots & \vdots \\ w_{0;N} & \cdots & \cdots & w_{N;N} \end{pmatrix}$$

Wherein the value marked as "x" is not to be used as it represents a distance zero vertically and horizontally from the reference pixel which is not applicable. This matrix may also be used as replacement of W in order to decrease the signalling overhead. In that case, only the absolute distance between the pixel to be predicted and the reference pixel is considered. For instance, in a block 4×4, the weight w for interpolating the pixel p(2, 3) using either reference pixel p'(1, −1) or p'(3, −1) for the prediction would be the same when using matrix $W^{(b)}$ since both correspond to distance of 1 pixel horizontally and 4 pixels vertically. On the other hand, matrix W enables distinguishing between the weights applied in the above two cases.

Distance matrices W are compact and independent of the block size and prediction mode. However, they imply that, for instance, all pixels in a certain distance from a reference pixel have the same weight. In order to make the assignment of weights even more flexible in this respect, an alternative to the distance based matrices W, may be a matrix of flags including for each pixel of the block a flag. The flags may be binary wherein a value of 1 means that the prediction without intra smoothing is used for the considered pixel and value 0 means that the prediction with intra smoothing is used for the pixel, or vice versa. Such a matrix of flags is more flexible than the distance based matrix W since its weights can be adapted, for instance, for each column. An example of a flag matrix for an 8×8 large block and the vertical direction mode is as follows:

$$F = \begin{pmatrix} 1 & 1 & 1 & 1 & 1 & 1 & 1 & 1 \\ 1 & 0 & 1 & 1 & 1 & 1 & 1 & 1 \\ 0 & 1 & 1 & 1 & 1 & 1 & 1 & 1 \\ 1 & 1 & 1 & 1 & 1 & 1 & 1 & 1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{pmatrix}$$

However, transmission of such a matrix may require more overhead than signalling a distance based matrix. This is caused by the fact that a separate flag matrix should be defined for each of the prediction modes and/or block sizes. Matrix of flags F may also be transmitted by sequence or per group of pictures or per frame for each block size and prediction mode, or employed for selected combinations of block size and prediction mode. Before embedding the matrix into the bitstream, the matrix is advantageously encoded by a run-length code or an entropy code. Any coding approach known for bi-level bitmaps may be applied. However, the flag matrix can be fixedly predefined for each combination of a block size and prediction mode at the encoder and the decoder. Regarding the flag matrix F, the present invention is not limited to binary representation, capable only of selecting whether a particular pixel is predicted using smoothed or non-smoothed reference pixels. The elements of the flag matrix may be multi-level elements determining the weight of mixing the prediction with and without smoothing the reference pixels. Since such flag matrices would probably require higher rate for transmission, this solution is more suitable for signalling only once for a whole sequence or for being fixed.

For most of the predicted pixels and most of the prediction modes the reference position used for prediction is a sub-pel position. This means, that an interpolation filter is applied on the full reference pixels. For instance, the reference position may be obtained as a weighted average of its closest neighbouring positions. Obtaining of such a position has already been exemplified above, namely, by applying of weights α and β in the example described with reference to FIG. 8. For instance, the currently under development HEVC standard already defines the different reference sub-pel positions for each pixel to be predicted. Typically, an interpolation filter is a low-pass filter applied on the full reference pixels in order to obtain a value between them by means of such an interpolation.

The smoothing filter as applied in the present invention is also a low-pass filter. However, this low-pass filter is not used to obtain the values between two full-pel reference pixels or any sub-pel reference pixels but rather to smooth a full reference pixel in its position with respect to the neighbouring full reference pixels. This enables to remove high frequencies from the full reference pixels. The smoothing filter in accordance with the present invention is pixel dependent. This results from the possibility to apply intra smoothing or not to apply intra smoothing depending on the pixel position.

In accordance with another advantageous embodiment of the present invention, the smoothing filter may be combined with the interpolation filter. For instance, a single filtering step may be applied for obtaining smoothed references and for obtaining a sub-pel position. Such a filtering step may be carried out by a filter with coefficients, which have been determined for cascaded smoothing and interpolation filter. Alternatively, the smoothing of reference pixels (all or those used in the particular intra prediction mode—for instance the top pixels 310 for the vertical mode) is performed once before starting the interpolation. The interpolation (to obtain the actual reference value for the intra prediction) of the subpel positions is then performed based on the already smoothed reference pixels.

The particular approach of the present invention is to use unfiltered reference pixels for prediction of block pixels in their proximity, exploiting thus the higher correlation between the block pixels and the reference pixels. On the other hand, the reference pixels are smoothed before using them for prediction of block pixels far away from the reference pixels, compensating therewith for the lower correlation and avoiding thus occurrence of high frequency components in the prediction error. This generalized approach may also be applied to interpolation filtering.

For instance, if several interpolation filters are defined, such filters can also be switched on a pixel basis based on the distance of pixels to the reference pixels used for their prediction. For example, a cubic interpolation filter, spline interpolation filter, interpolation filter based on Wiener filter or linear interpolation filter maybe selected on the pixel basis. (More details on Wiener filter and its design can be found in S. Haykin, "Adaptive Filter Theory", Fourth Edition, *Prentice Hall Information and System Sciences Series*, Prentice Hall, 2002. which is incorporated herein by reference.) It should be understood that any filter type is applicable to the present invention. The idea is to select the filter type and/or characteristic according to the distance between the pixel to be interpolated and the reference pixels used for its interpolation. This is to increase the contribution of reference pixels to the well correlated block pixels (typically the pixels closer to the reference pixels) and to decrease the contribution of reference pixels to the less correlated block pixels (typically block pixels far from the reference pixels). In particular, the more accurate cubic interpolation may be used for pixels close to the references while the linear interpolation could be used for the other pixels. Alternatively, a Wiener filter may be used for filtering the closer pixels and linear filter may be used for farther pixels. The decision regarding the filter to be applied may be performed based on a flag matrix or a distance matrix described above for smoothing filter. The flag matrix can be used for deciding on both application of smoothing filtering and application of particular type(s) of interpolation filtering. In such a case, no additional bandwidth would be necessary to signal selection of the interpolation filter. Alternatively, a separated and independent mechanism for deciding about the type of interpolation filter for a particular pixel within the block may be employed. This may be facilitated by a separately signalled or predefined flag matrix or distance based matrix or a distance parameter as described above. However, the same may also be implemented by means of a fixed rule. For example, two distance matrices could be signalled, one to control the weighting of the prediction with and without intra smoothing of the reference pixels, one to control the weighting of the prediction with two different types of interpolation filters. In that case, four predicted values would be available for the considered pixel:

$pred_{NSF1}[p(x, y)]$: prediction without intra smoothing using interpolation filter type 1

$pred_{NSF2}[p(x, y)]$: prediction without intra smoothing using interpolation filter type 2

$pred_{SF1}[p(x, y)]$: prediction with intra smoothing using interpolation filter type 1

$pred_{SF2}[p(x, y)]$: prediction with intra smoothing using interpolation filter type 2

If $w_S$ is the weight for intra smoothing and $W_F$ is the weight for the interpolation filter, the final prediction could be:

$$\text{pred}[p(x,y)] = w_F w_S \text{pred}_{NSF1}[p(x,y)] + w_F(1-w_S)\text{pred}_{SF1}[p(x,y)] + (1-w_F)w_S \text{pred}_{NSF2}[p(x,y)] + (1-w_F)(1-w_S)\text{pred}_{SF2}[p(x,y)]$$

Figure 9:
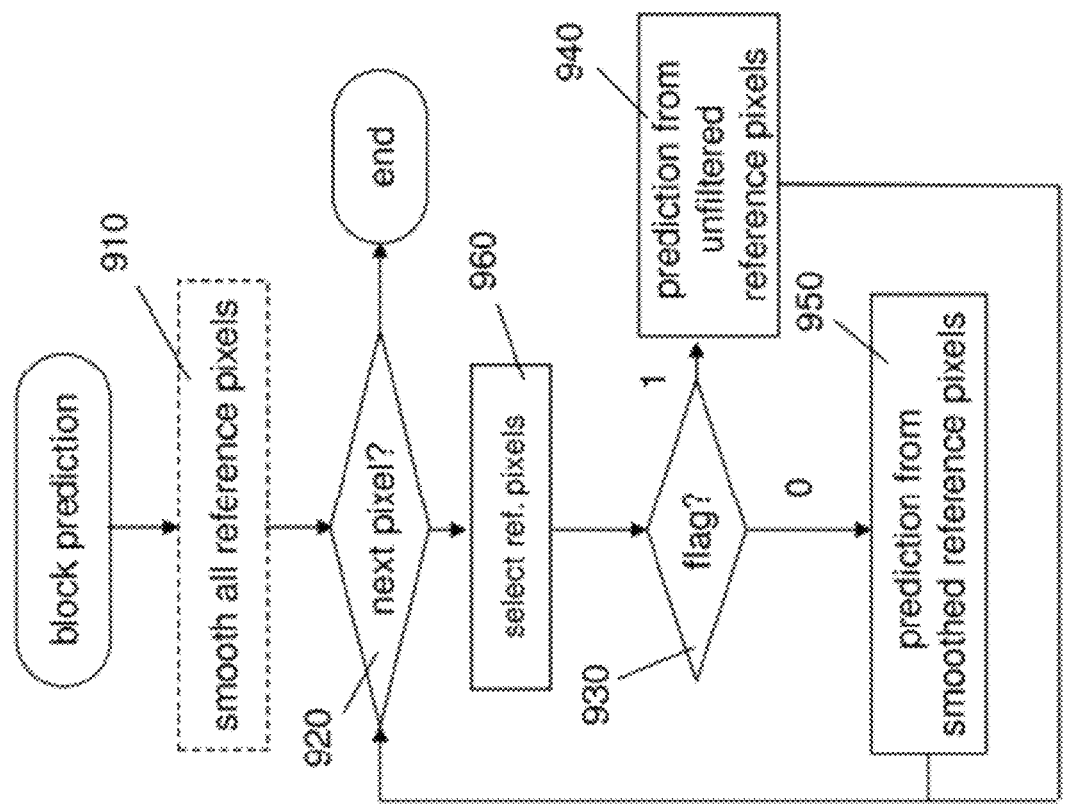
FIG. 9 is a flow diagram of a method for performing intra prediction using pixel adaptive intra smoothing with a flag matrix in accordance with an exemplary embodiment of the present invention.

FIG. 9 illustrates a flow chart of a method in accordance with an advantageous embodiment of the present invention. A block of an image to be predicted is selected and an intra prediction mode is determined for predicting the selected block. The intra predicting mode may be for instance one of the 9 modes defined in H.264/MPEG-4 AVC as described with reference to FIG. 3B. However, the intra prediction mode may be also another mode for instance any directional prediction in a direction which is not defined by these nine prediction modes. Such a mode may be determined by detecting the edges entering the block to be predicted with a higher accuracy and by predicting along such a determined edge or a plurality of edges. Alternatively, such a mode may be one of the 33 directional modes defined in the currently under development HEVC standard. Once the prediction mode is determined, it is clear which available reference pixels are to be used for predicting each of the pixels in the block. For the purpose of the present embodiment, the reference pixels may be smoothed 910 at the beginning of the prediction and the same smoothed reference pixels may then be used for prediction of pixels in the image block to be predicted. However, as described above, smoothing of reference pixels may also be performed as a part of the step of interpolating the subpel reference positions 950. The flow diagram in FIG. 9 describes a method according to an exemplary embodiment of the present invention applied separately to each pixel of the block to be predicted. However, this is only an example and the present invention may also be carried out by a software or hardware supporting vector and matrix operations in such a way that applying the smoothing and/or interpolation for prediction of more pixels in the block is performed in a single step. The prediction is performed for each pixel 920 of the block. For each pixel, the reference pixel or a plurality thereof is selected. This selection is based on the prediction mode determined. Then, a flag in a flag matrix is checked 930. If the flag is set to one, the prediction is to be carried out based on the reference pixels which have not been smoothed and/or based on a first interpolation filter type 940. On the other hand, in case the flag is zero, the prediction is to be carried out from the smoothed reference pixels and/or based on a second interpolation filter type 950. It should be noted that the present invention is not limited to this implementation and the flag matrix may also include other than binary values. For instance, the value of a non binary flag may indicate a weight for the interpolation filter using the unfiltered reference pixels and interpolation filter using the smooth reference pixels. If the flag matrix is applied for pixel-adaptive interpolation filtering, the flags may signal the type of filter and/or the filter to be applied for interpolation.

Figure 10:
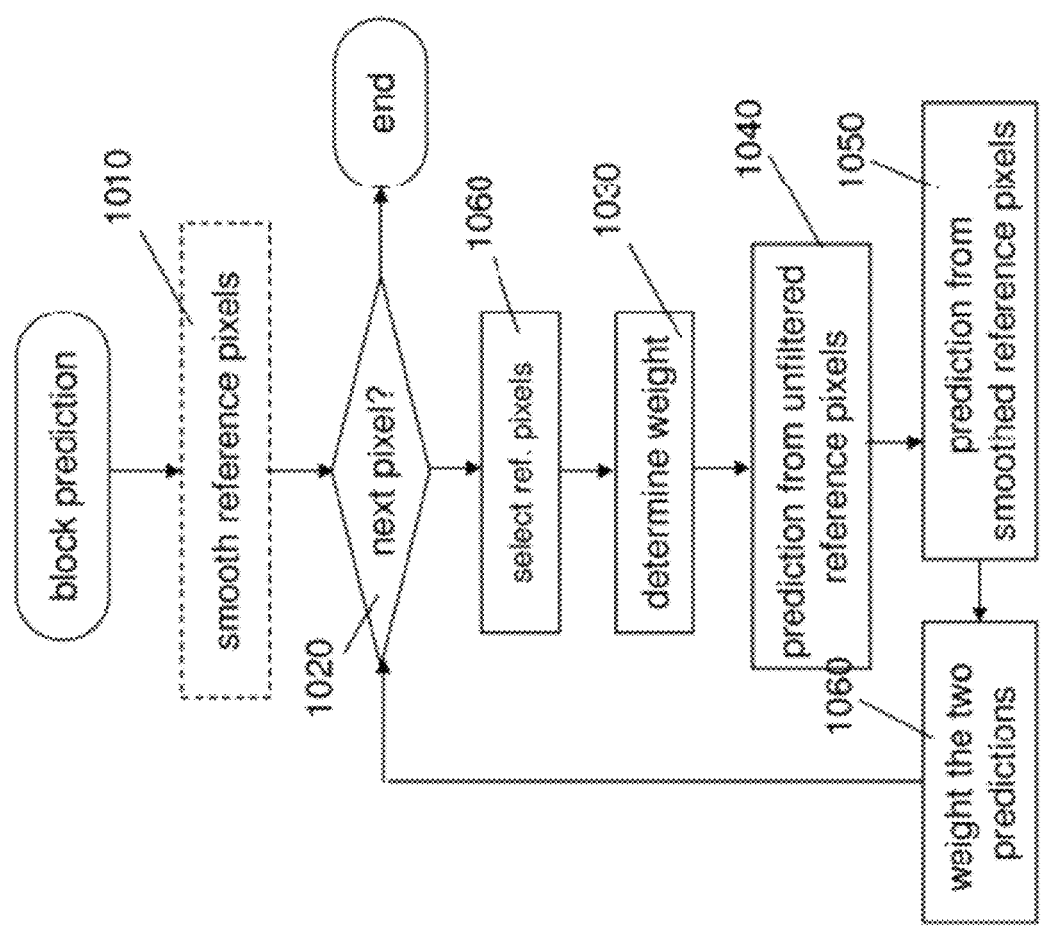
FIG. 10 is a flow diagram of a method for performing intra prediction using pixel adaptive intra smoothing with a distance matrix in accordance with another exemplary embodiment of the present invention.

FIG. 10 illustrates another exemplary embodiment of a method according to the present invention making use of a distance matrix. Similarly to the example described with reference to FIG. 9, this flow diagram is illustrative and in practice, the steps performed on different pixels may be implemented in software and/or in hardware as a single operation such as vector based operation. Moreover, smoothing of reference pixels may be performed jointly with the interpolation filtering for the smoothed reference pixels by means of determining weights of a smoothing and interpolating filter and applying such a single filter for predicting the block pixels. As soon as the block to be predicted and a prediction mode for said block is determined, the reference pixels to be used for predicting each of the block pixels are determined. Thus, the reference pixels may be smoothed 1010 in advance. Then, for each pixel 1020 based on its distance to the reference pixels a weight is determined 1030. The weight specifies whether prediction from unfiltered reference pixels 1040 and/or prediction from smooth reference pixels 1050 is to be applied and in which ratio they are to be combined 1060. Accordingly, the prediction of each pixel is performed.

Figure 11:
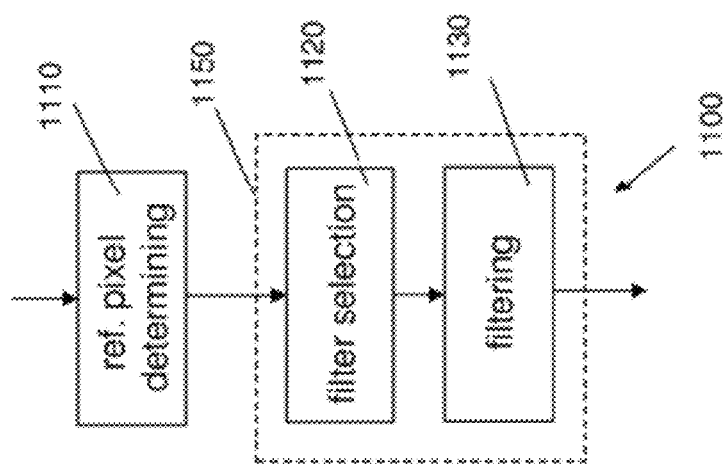
FIG. 11 is a block diagram illustrating functional blocks of an exemplary apparatus according to the present invention.

FIG. 11 illustrates an apparatus for implementing the present invention. In particular, a unit 1110 for determining reference pixels determines for a particular pixel of a block which reference pixel or pixels are to be used for its prediction depending on a prediction mode. The predictor 1150 then predicts the pixel of a block using these reference pixel(s). The unit 1110 for determining reference pixels may determine the reference pixels according to the result of determination of spatial prediction direction. The predictor 1150 includes means 1120 for selecting the filter according to the position of the block pixel to be predicted, in particular according to its distance to the reference pixels being used for its prediction. Accordingly, the filtering unit (filter) 1130 is then applied to the reference pixels to obtain the prediction of the block pixel. The filtering itself may include smoothing of reference pixels, interpolating a sub-pel position between two full-pel reference pixels, and extrapolating the interpolated sub-pel position along the prediction direction to the block pixel. The extrapolation may be copying the interpolated sub-pel value as the block pixel to be predicted. However, the filtering itself may only include smoothing the reference pixel and copying it to the block pixel or copying an unsmoothed reference pixel to the block pixel.

Figure 1:
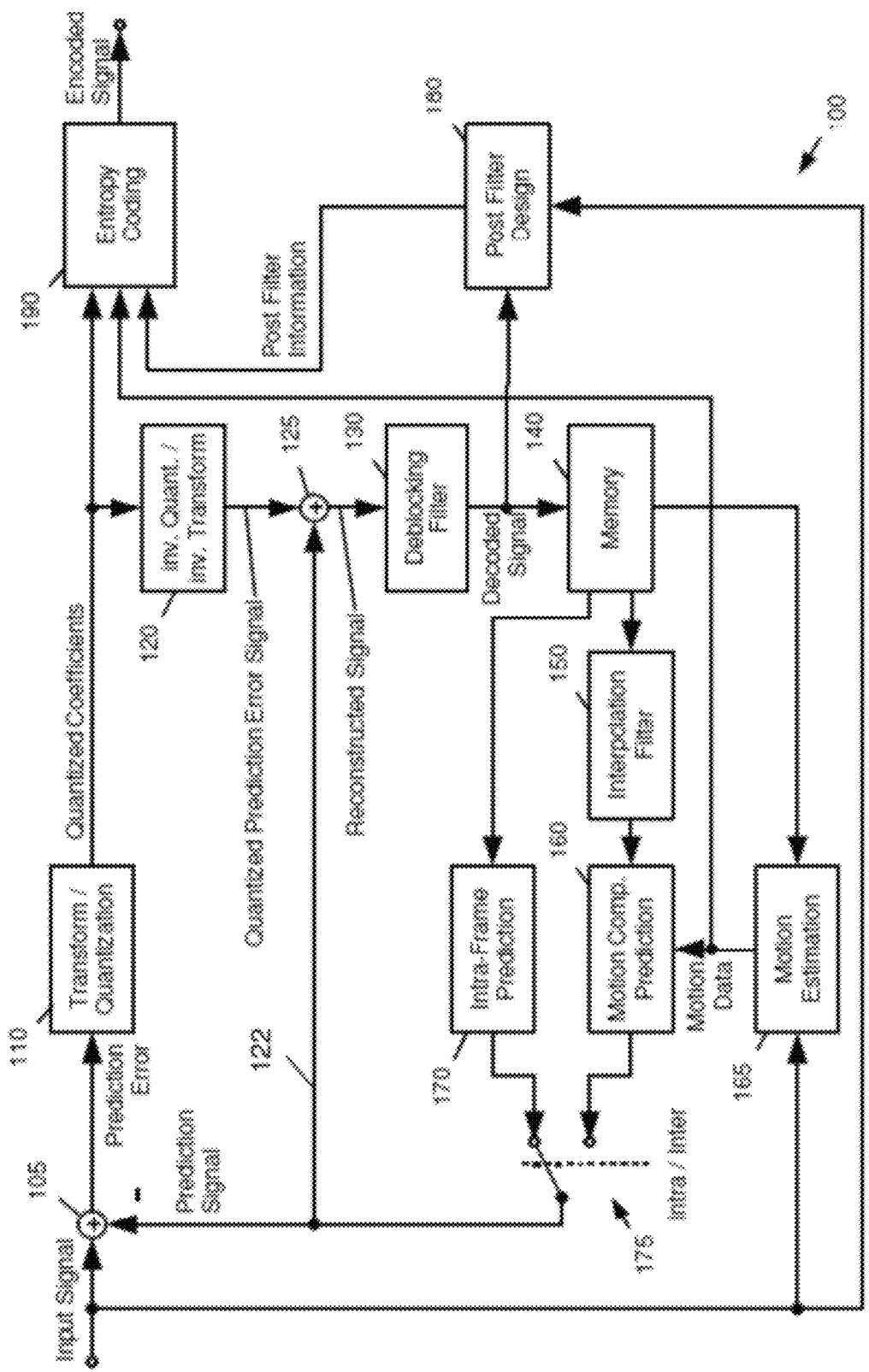
FIG. 1 is a block diagram illustrating an example of a conventional H.264/MPEG-4 AVC video encoder.
Figure 2:
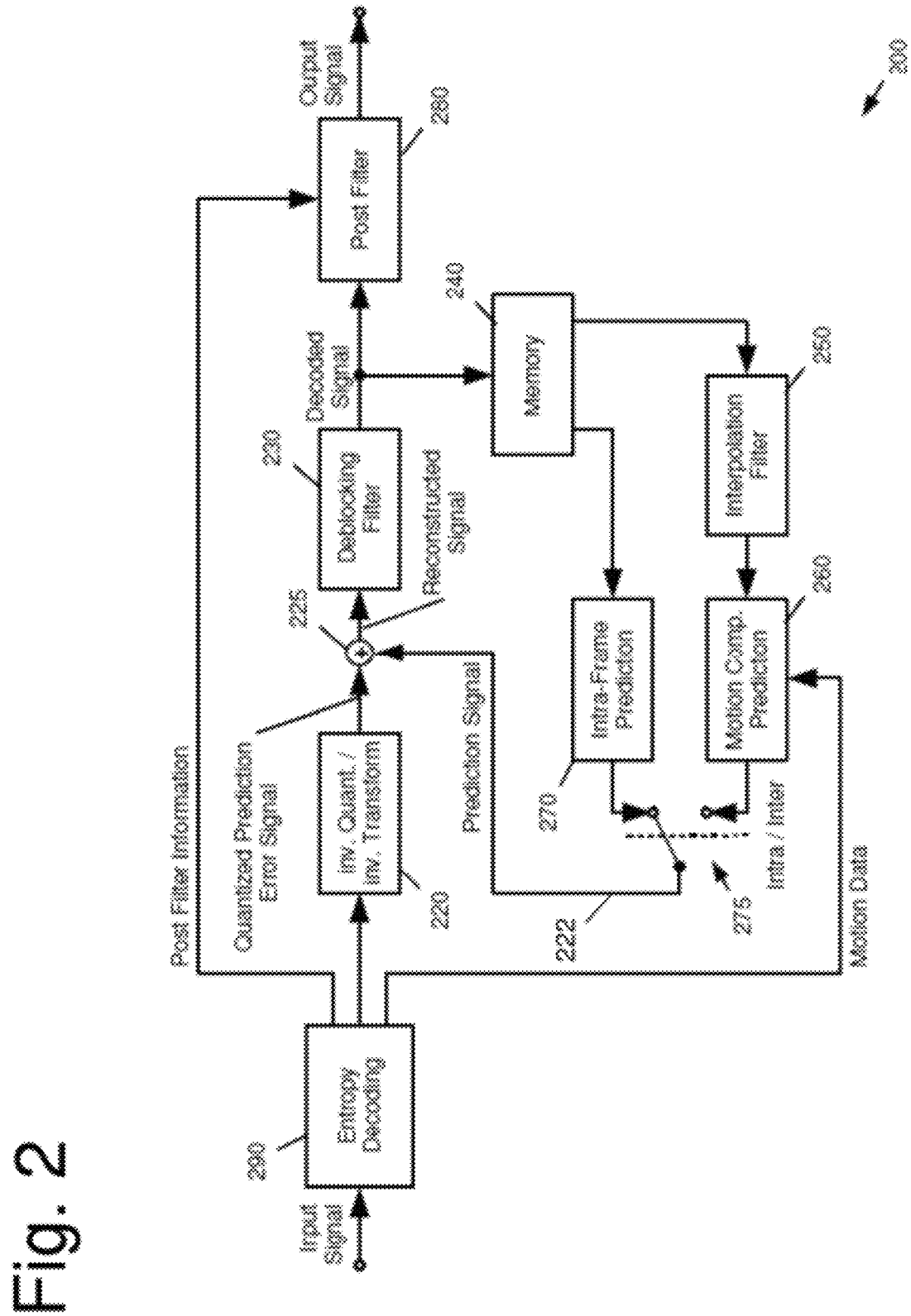
FIG. 2 is a block diagram illustrating an example of a conventional H.264/MPEG-4 AVC video decoder.

The apparatus 1100 may be embedded into the encoder and/or decoder as described with reference to FIGS. 1 and 2. In particular, it may be comprised within the intra-prediction unit 170 of the encoder 100 or intra-prediction unit 270 of the decoder 200.

In general terms, the present invention provides a method for predicting pixels of an image block in a digital image based on reference pixels spatially adjacent to said image block. The method includes determining for a pixel of the image block at least one reference pixel adjacent to said block; and predicting said pixel of the image block by applying filtering to said determined at least one reference pixel, wherein the filter characteristics depend on the distance of said pixel of the image block to said at least one reference pixel.

Advantageously, for at least one image block pixel the prediction step includes smoothing said at least one reference pixel by a low-pass filter and predicting said at least one image block pixel from said at least one smoothed reference pixel. In particular, predicting includes interpolating at least one sub-pel position from said at least one smoothed reference pixel and extrapolating said at least one image block pixel by copying said at least one interpolated sub-pel position. The copying here means assigning as the block pixel the value interpolated from said at least one smoothed reference pixel. This may be also directly the smoothed reference pixel, or a combination of a plurality of smoothed reference pixels.

The low-pass filter may be, for instance, a filter weighting the reference pixel to be smoothed and its closest two (left and right or top and bottom) neighboring reference pixels. For instance, the weights for averaging these three pixels may be set to ratio 1:2:1. However, the present invention is not limited thereby and the weights for reference pixel smoothing may be set arbitrarily with regard to the application.

Furthermore, the reference pixels may be smoothed with weights depending on the position of the pixel to be predicted from the reference pixels. In particular, for prediction of the pixels close to the reference pixels, low smoothing is advantageously applied. This may be achieved, for instance, by increasing the weight of the pixel to be smoothed with respect to the weights of its neigbouring one or more pixels over which the smoothing is performed. On the other hand, for prediction of the pixels farther to the reference pixels, high smoothing is advantageously applied. This may be achieved, for instance, by decreasing the weight of the pixel to be smoothed with respect to the weights of its neigbouring one or more pixels over which the smoothing is performed.

According to an exemplary embodiment, pixels of the block in a distance smaller than a predefined threshold are predicted from the at least one reference pixel without smoothing, and pixels of the block in a distance greater than or equal to said predefined threshold are predicted from the at least one reference pixel previously smoothed. This approach may further be refined by predicting at least one image block pixel as a weighted sum of a prediction from the smoothed reference pixel and a prediction from the same pixel without smoothing.

In particular, according to another exemplary embodiment, pixels of the block in a distance smaller than a predefined first threshold are predicted from the at least one reference pixel without smoothing, pixels of the block in a distance equal to or greater than the predefined first threshold and smaller than a predefined second threshold are predicted as a weighted sum of a prediction from the smoothed reference pixel and a prediction from the same pixel without smoothing, and pixels of the block in a distance greater than or equal to said predefined second threshold are predicted from the at least one reference pixel previously smoothed.

The weights for the weighted sum are advantageously defined for each vertical and/or horizontal component of the distance between the at least one image block pixel and the reference pixel used for its prediction. In particular, the weights may be organized in a matrix, wherein the elements of the matrix are proportional to the elements of autocorrelation matrix of the image pixels. Alternatively, the elements of the matrix may be either 0 or 1. Alternatively, the weights may be derived based on statistics of images from a training set. The training set may be predetermined and include some typical images. However, the training set may also be built during encoding and decoding images of a video sequence based on the respective already encoded and decoded pixels.

The present invention is not limited to application of smoothing to the reference pixels. Instead of smoothing, the pixel adaptive prediction may employ predicting a pixel of the image block from at least one reference pixel selected for said pixel, wherein the type of interpolation filtering is different for at least two pixels in the image block, the type of filtering including at least one of linear filtering, copying the at least one reference pixel, cubic filtering, or Wiener filtering. For instance, a more precise cubic or Wiener filtering is applied to the pixels near to the reference pixels used for their prediction and a less precise linear filtering or pixel copying (meaning taking the value of the nearest reference pixel in the direction of prediction) may be applied to the pixels of the block not located near to the reference pixels used for their prediction.

The prediction method described above may be applied to various applications. In particular, it may be applied for intra prediction during image and/or video encoding and decoding.

Accordingly, a method for encoding a block of pixels in a video frame is provided, which includes the steps of predicting the block of pixels in accordance with the prediction method as described above, encoding difference between the predicted block and the original image block, and embedding the encoded differences within a bitstream.

The step of embedding advantageously further includes embedding into the bitstream at least one parameter indicating which filter is to be applied for each pixel. For instance, the parameter may be a threshold for indicating a distance between a block pixel and a reference pixel used for its prediction up to which a first filtering is applied and starting from which a second filtering is applied, the second filter being different from the first filter. Alternatively, more than one thresholds may be provided for subdividing the block to be predicted into more regions wherein each region may be predicted differently. In particular, for pixels closer to reference pixels, prediction should take particular reference pixels with higher fidelity. For pixels farther from the reference pixels, the prediction should take filtered reference pixels. This enables adapting of the prediction to the fact that pixel nearer to the reference pixels are more correlated therewith than the pixels more far away.

The term "closer" in the context of this description should not be necessarily understood in terms of orthogonal projection, but rather as closest in the direction of the prediction.

Another alternative for the parameters to be signalled within the bitstream is a plurality of weights for weighting a combination of prediction using smoothed reference pixels and prediction using non-smoothed reference pixels, the weights being different for at least two different pixel positions within the block. An example therefore is a distance matrix described above. Still alternatively, for each pixel an indicator indicating which filtering is to be applied to said pixel. For instance, a flag matrix, described above, may be used.

Regarding the embedding, the parameter(s) may be embedded within sequence specific parameters once per sequence, or on a per GoP basis. However, the parameter(s) may also be embedded on a frame or slice basis. The limiting factor is data rate which is increasing with additional information elements embedded into the bitstream. In order to reduce the overhead caused by signalling a threshold or a weighting matrix, these may be further encoded by applying a run-length coding (especially suitable for binary matrices such as flag or distance matrix may be) and/or entropy coding (particularly suitable if the weights have highly different occurrence probabilities) and/or predictive coding (particularly suitable if the weights are locally correlated), or any other lossless compression methods.

Correspondingly to the above encoder, a method for decoding a block of pixels from an bitstream is provided with the steps of extracting a block of pixel differences from the bitstream, predicting a block of pixels according to the prediction method describe above or any of its embodiments, and decoding the block of pixels by adding to the extracted pixel differences the predicted block of pixels.

The prediction method, as well as the coding and decoding methods may also be provided as a computer program product comprising a computer-readable medium having a computer-readable program code embodied thereon, the program code being adapted to carry out any of these methods.

Furthermore, it should be also noted that the pixel-adaptive prediction in accordance with any of the above embodiments may also be used for other applications than the intra prediction, such as error concealment.

The processing described in each of embodiments can be simply implemented in an independent computer system, by recording, in a recording medium, a program for implementing the configurations of the video coding method and the video decoding method described in each of embodiments. The recording media may be any recording media as long as the program can be recorded, such as a magnetic disk, an optical disk, a magnetic optical disk, an IC card, and a semiconductor memory.

Hereinafter, the applications to the video coding method and the video decoding method described in each of embodiments and systems using thereof will be described.

Figure 12:
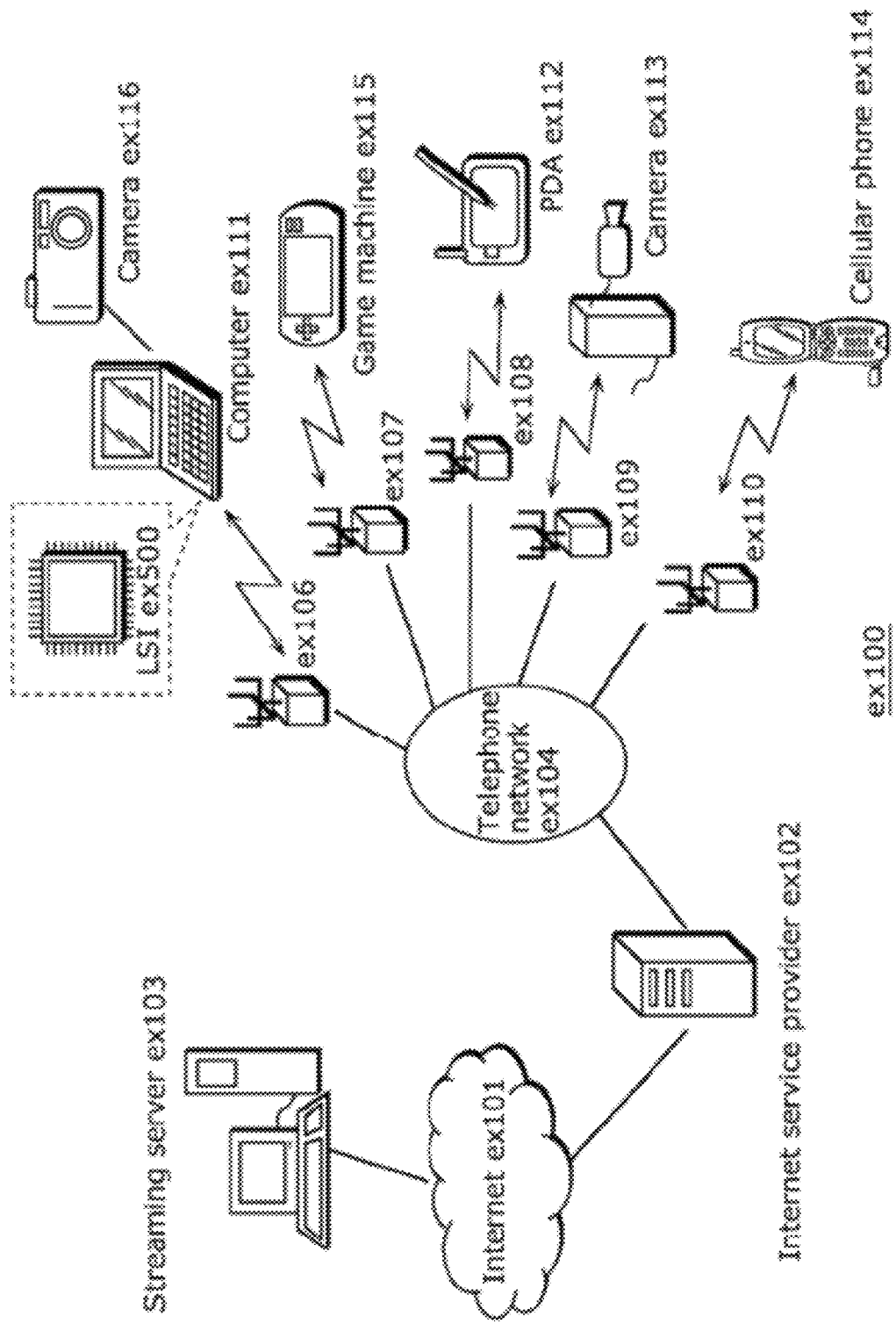
FIG. 12 is a schematic drawing of an overall configuration of a content providing system for implementing content distribution services.

FIG. 12 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 12, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments, and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 13:
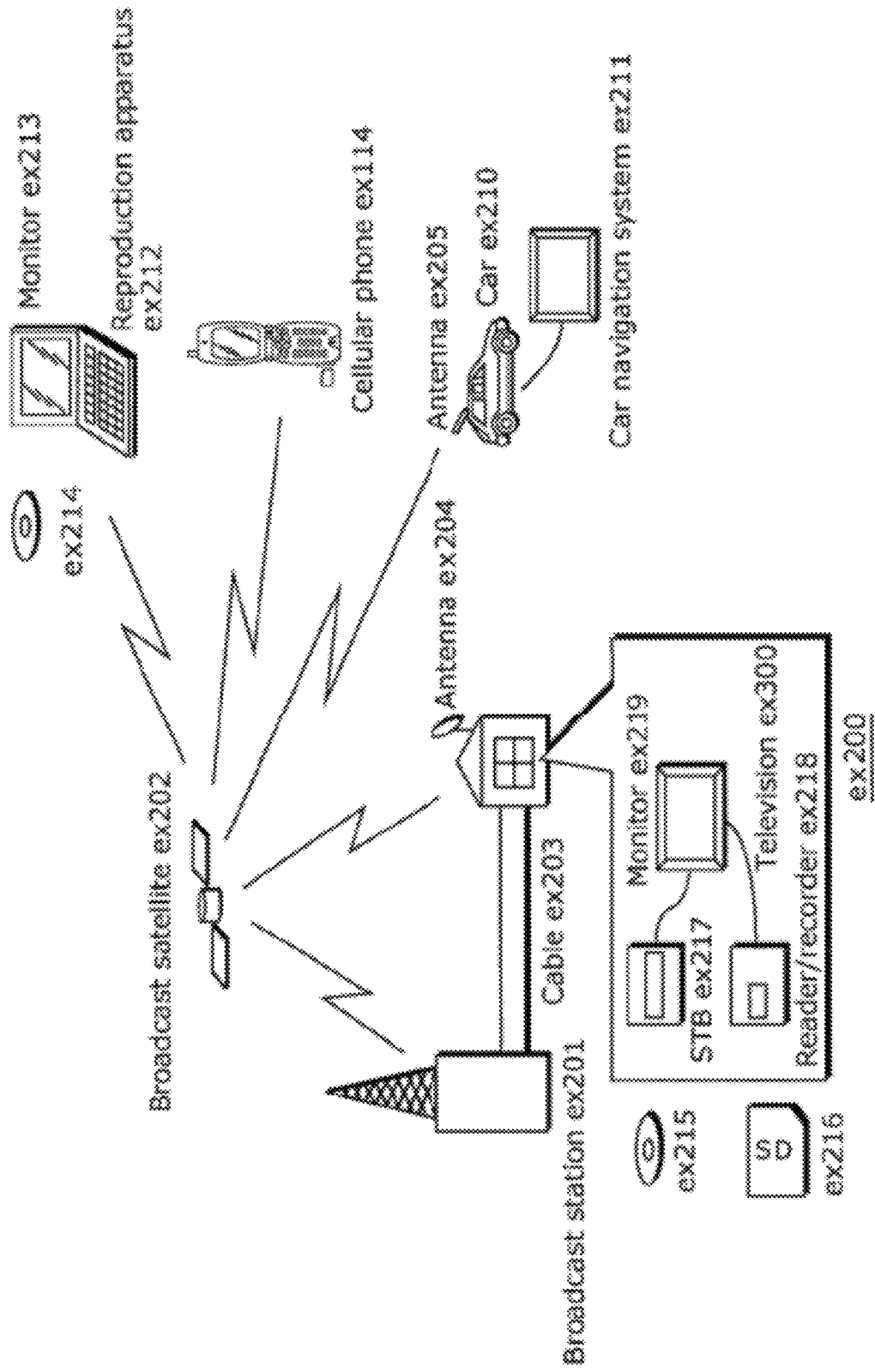
FIG. 13 is a schematic drawing of an overall configuration of a digital broadcasting system.

Aside from the example of the content providing system ex100, at least one of the video coding apparatus and the video decoding apparatus described in each of embodiments may be implemented in a digital broadcasting system ex200 illustrated in FIG. 13. More specifically, a broadcast station ex201 communicates or transmits, via radio waves to a broadcast satellite ex202, multiplexed data obtained by multiplexing audio data and others onto video data. The video data is data coded by the video coding method described in each of embodiments. Upon receipt of the multiplexed data, the broadcast satellite ex202 transmits radio waves for broadcasting. Then, a home-use antenna ex204 with a satellite broadcast reception function receives the radio waves.

Next, a device such as a television (receiver) ex300 and a set top box (STB) ex217 decodes the received multiplexed data, and reproduces the decoded data.

Furthermore, a reader/recorder ex218 (i) reads and decodes the multiplexed data recorded on a recording media ex215, such as a DVD and a BD, or (i) codes video signals in the recording medium ex215, and in some cases, writes data obtained by multiplexing an audio signal on the coded data. The reader/recorder ex218 can include the video decoding apparatus or the video coding apparatus as shown in each of embodiments. In this case, the reproduced video signals are displayed on the monitor ex219, and can be reproduced by another device or system using the recording medium ex215 on which the multiplexed data is recorded. It is also possible to implement the video decoding apparatus in the set top box ex217 connected to the cable ex203 for a cable television or to the antenna ex204 for satellite and/or terrestrial broadcasting, so as to display the video signals on the monitor ex219 of the television ex300. The video decoding apparatus may be implemented not in the set top box but in the television ex300.

Figure 14:
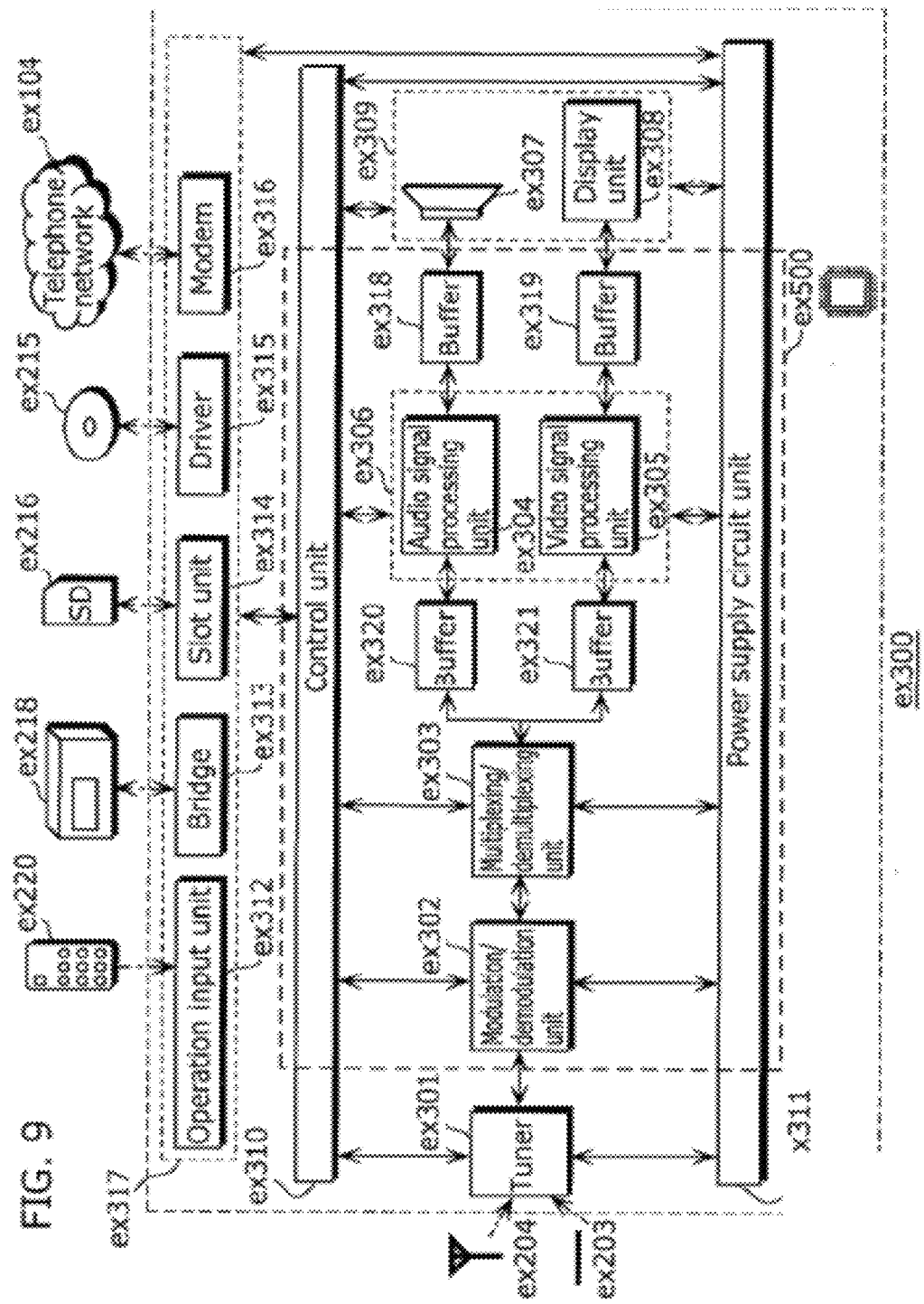
FIG. 14 is a block diagram illustrating an example of a configuration of a television.

FIG. 14 illustrates the television (receiver) ex300 that uses the video coding method and the video decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300.

Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figures 10, 15:
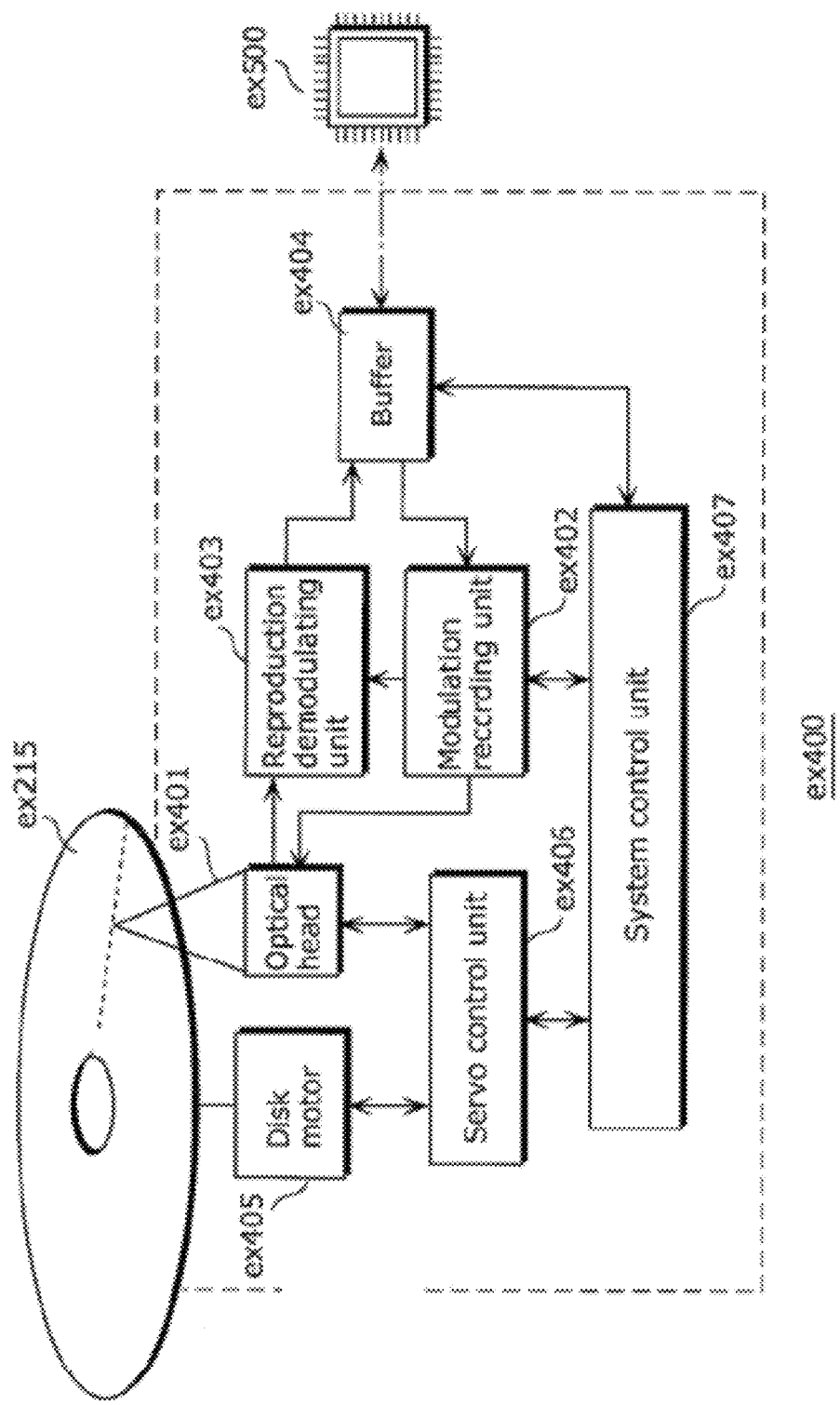
FIG. 15 is a block diagram illustrating an example of a configuration of an information reproducing/recording unit that reads and writes information from or on a recording medium that is an optical disk.

As an example, FIG. 15 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 16:
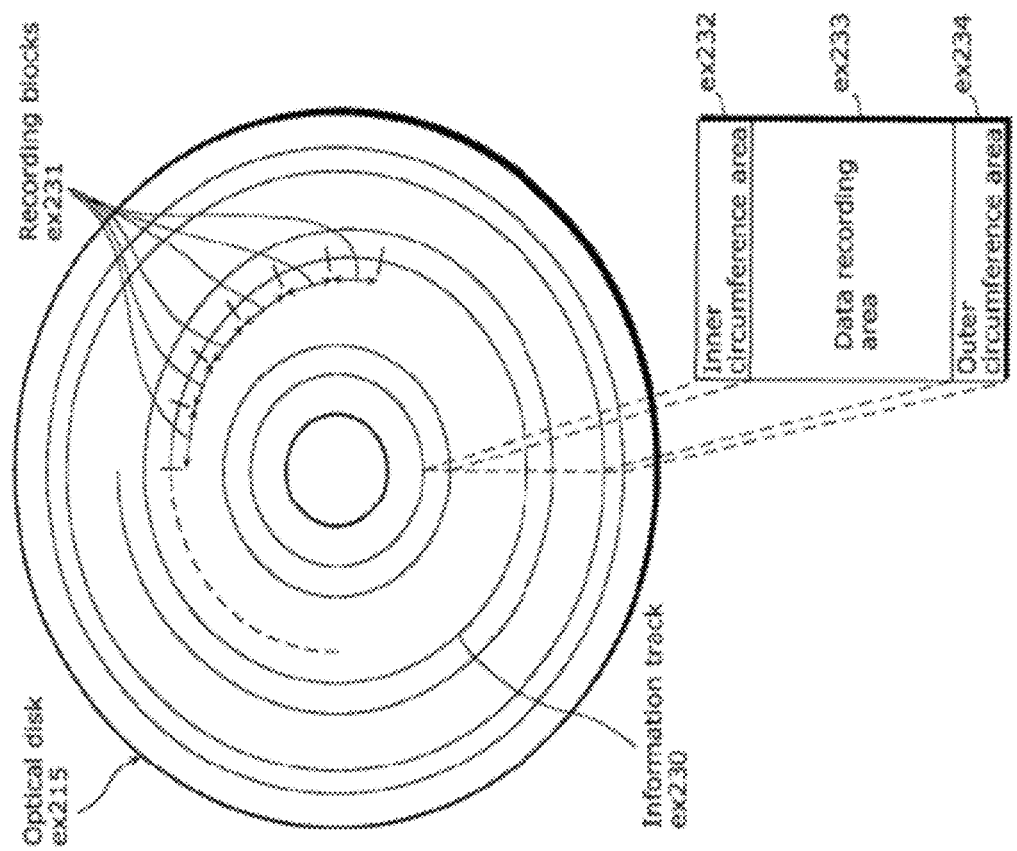
FIG. 16 is a schematic drawing showing an example of a configuration of a recording medium that is an optical disk.

FIG. 16 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 13. The same will be true for the configuration of the computer ex111, the cellular phone ex114, and others.

Figure 17A:
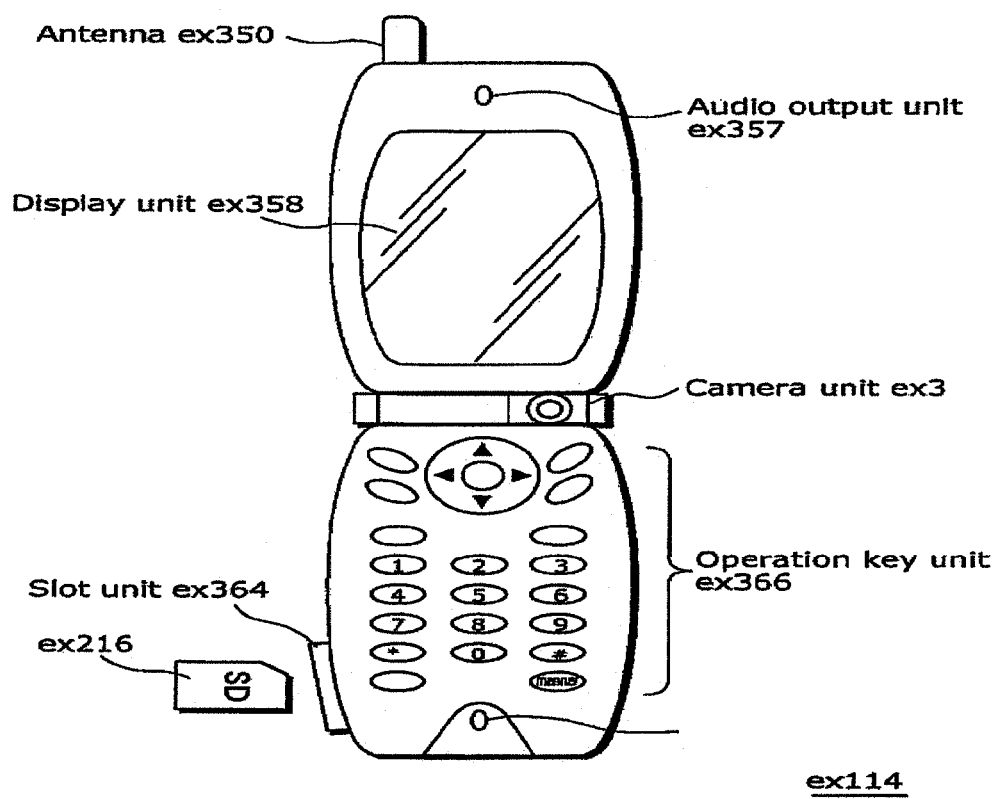
FIG. 17A is a schematic drawing illustrating an example of a cellular phone.

FIG. 17A illustrates the cellular phone ex114 that uses the video coding method and the video decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Next, an example of a configuration of the cellular phone ex114 will be described with reference to FIG. 17B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350.

Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex356.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the video coding method shown in each of embodiments, and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method.

Then, the modulation/demodulation unit ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a video decoding method corresponding to the coding method shown in each of embodiments, and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the pixel block interpolation method according to any embodiment of the present invention, possibly implemented within video coding and video decoding can be used in any of the devices and systems described. Thus, the advantages described in each of embodiments can be obtained.

Furthermore, the present invention is not limited to embodiments, and various modifications and revisions are possible without departing from the scope of the present invention.

Video data can be generated by switching, as necessary, between (i) the video coding method or the video coding apparatus shown in each of embodiments and (ii) a video coding method or a video coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the video coding method and by the video coding apparatus shown in each of embodiments will be hereinafter described. The multiplexed data is a digital stream in the MPEG2-Transport Stream format.

Figure 18:
FIG. 18 is a schematic drawing showing a structure of multiplexed data.

FIG. 18 illustrates a structure of the multiplexed data. As illustrated in FIG. 18, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the video coding method or by the video coding apparatus shown in each of embodiments, or in a video coding method or by a video coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

Figure 19:
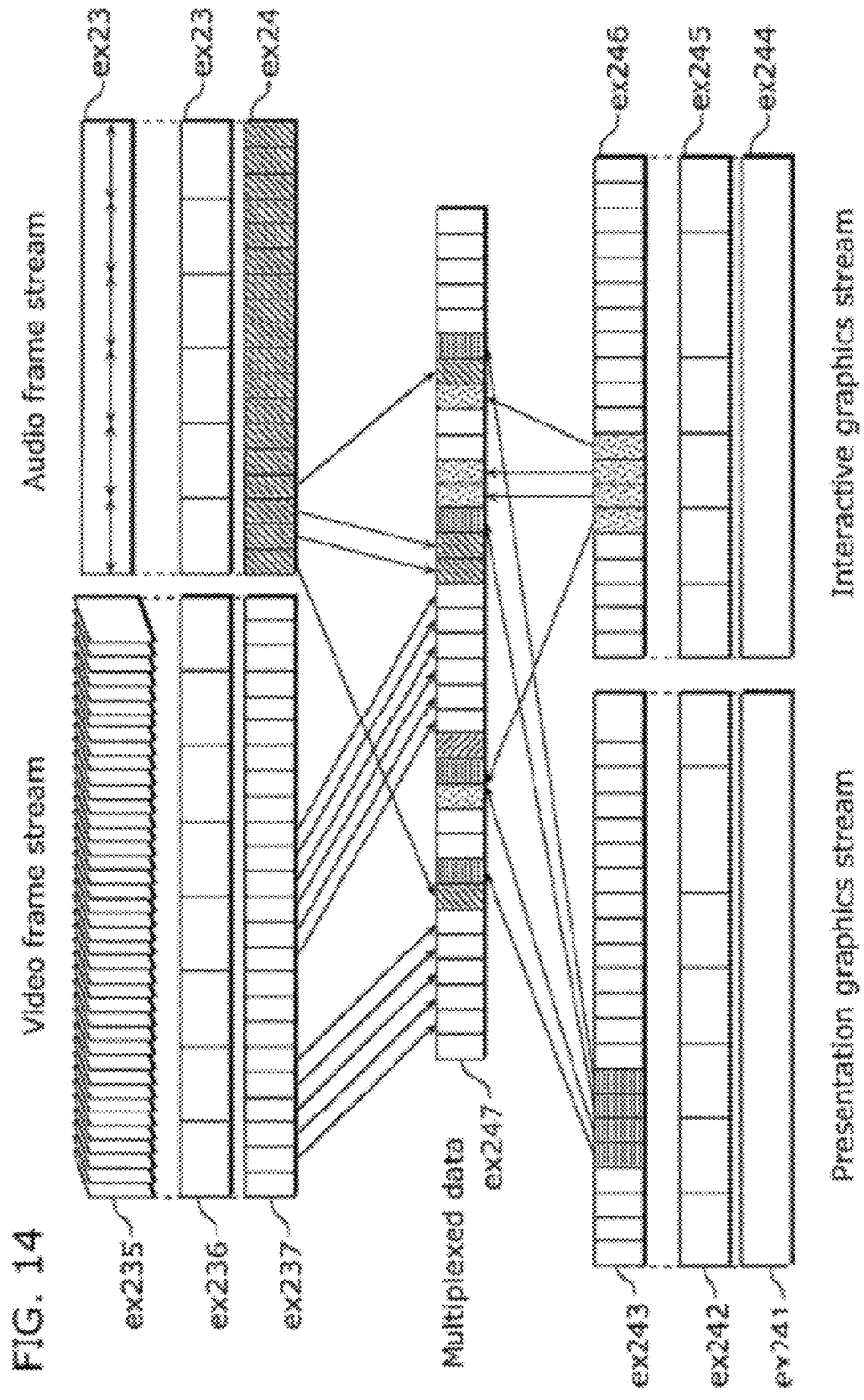
FIG. 19 is a schematic drawing schematically illustrating how each of the streams is multiplexed in multiplexed data.

FIG. 19 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 20:
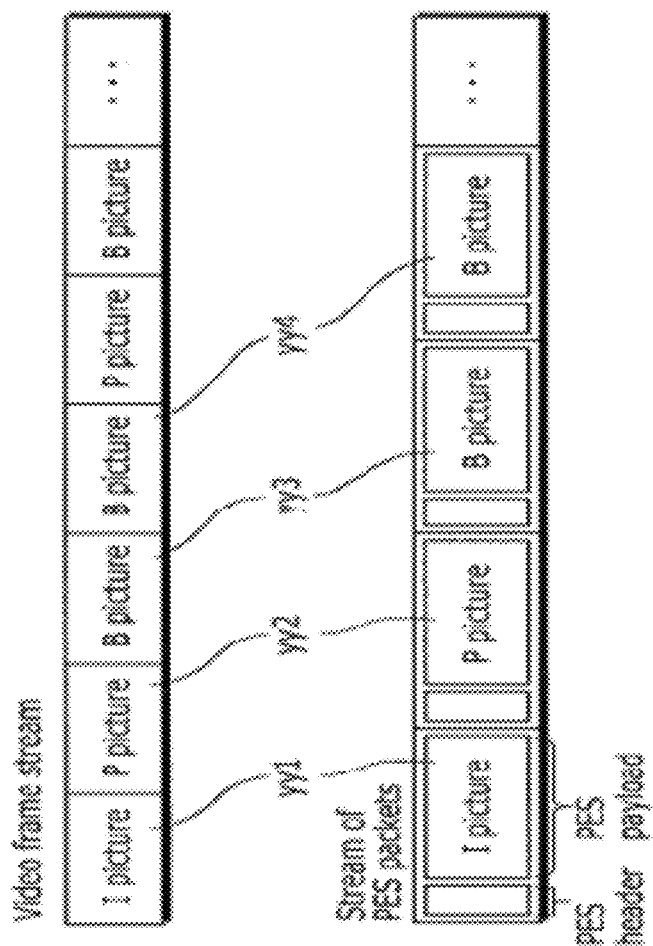
FIG. 20 is a schematic drawing illustrating how a video stream is stored in a stream of PES packets in more detail.

FIG. 20 illustrates how a video stream is stored in a stream of PES packets in more detail. The first bar in FIG. 20 shows a video frame stream in a video stream. The second bar shows the stream of PES packets. As indicated by arrows denoted as yy1, yy2, yy3, and yy4 in FIG. 20, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 21:
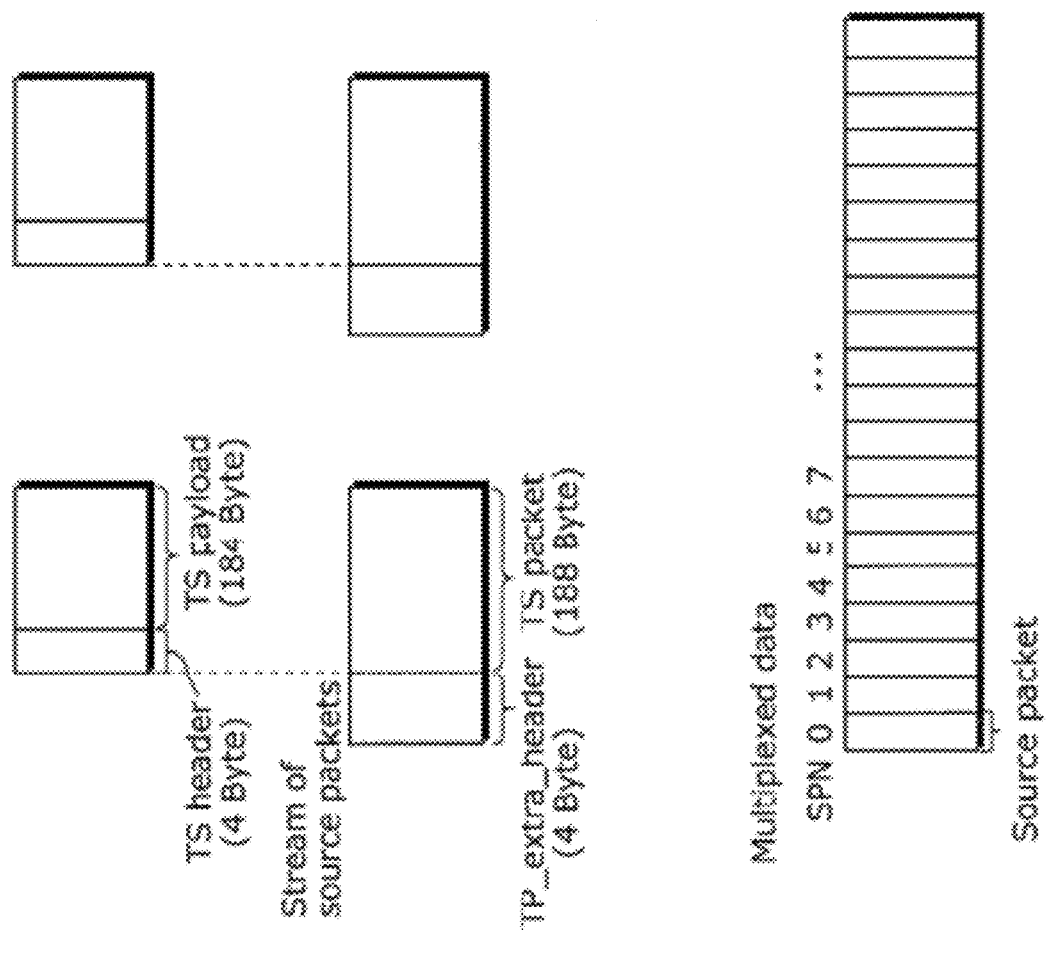
FIG. 21 is a schematic drawing showing a structure of TS packets and source packets in the multiplexed data.

FIG. 21 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 21. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 22:
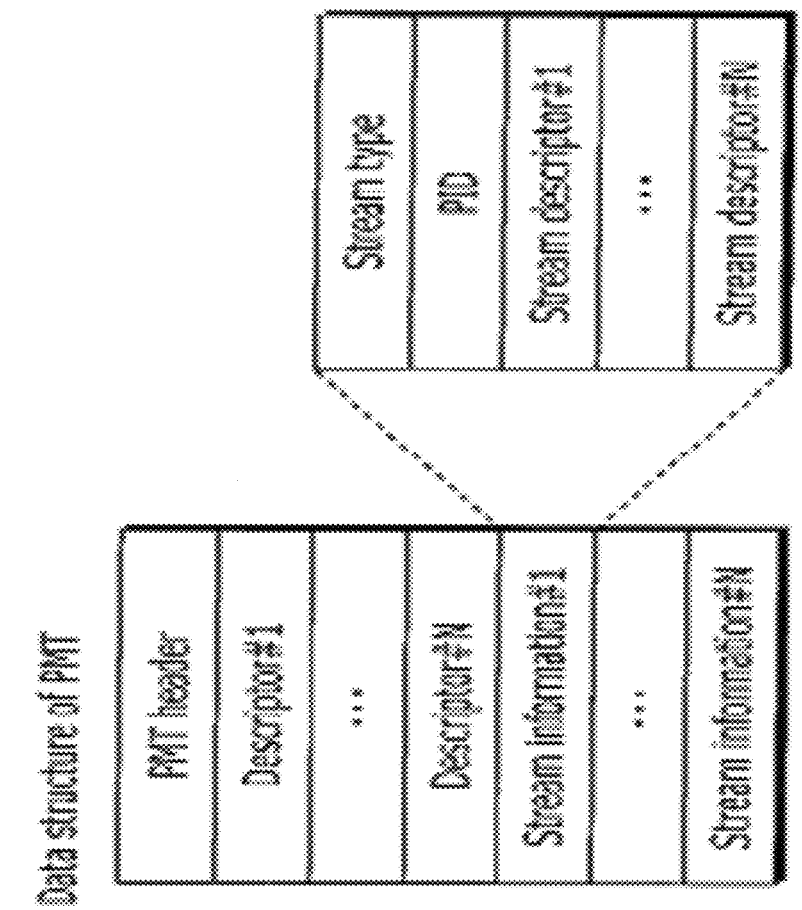
FIG. 22 is a schematic drawing showing a data structure of a PMT.

FIG. 22 illustrates the data structure of the PMT in detail. A PMT header is disposed at the top of the PMT. The PMT header describes the length of data included in the PMT and others. A plurality of descriptors relating to the multiplexed data is disposed after the PMT header.

Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 23:
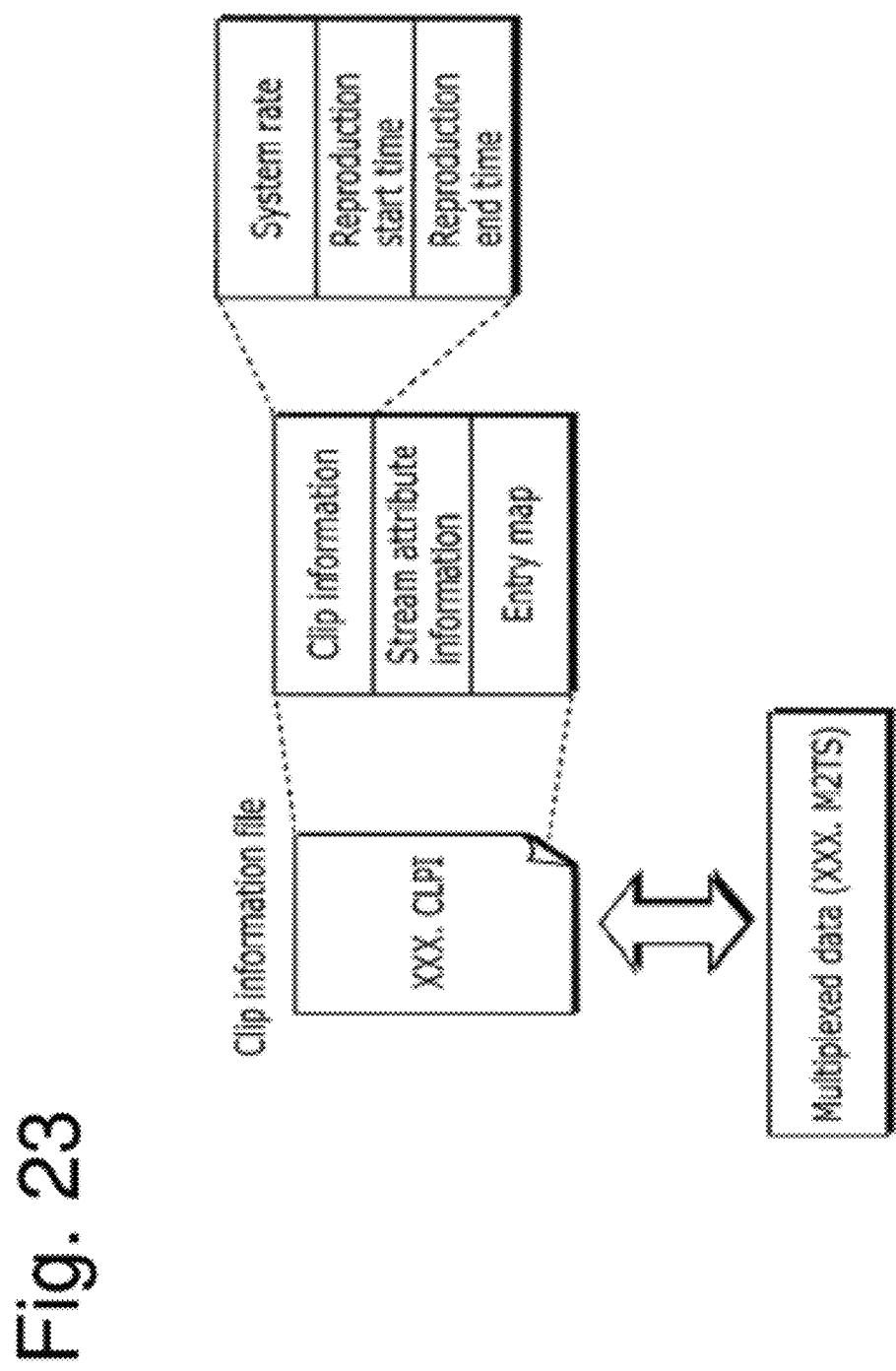
FIG. 23 is a schematic drawing showing an internal structure of multiplexed data information.

Each of the multiplexed data information files is management information of the multiplexed data as shown in FIG. 23. The multiplexed data information files are in one to one correspondence with the multiplexed data, and each of the files includes multiplexed data information, stream attribute information, and an entry map.

As illustrated in FIG. 23, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 24:
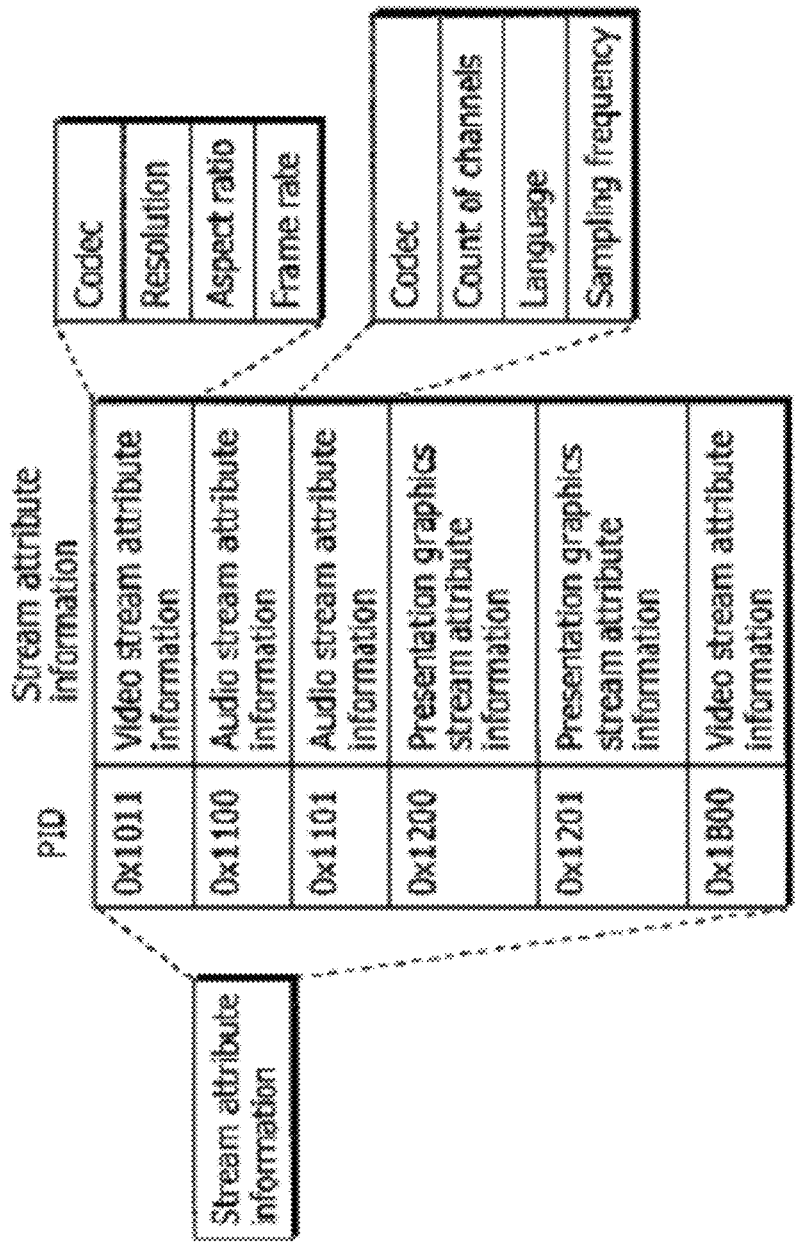
FIG. 24 is a schematic drawing showing an internal structure of stream attribute information.

As shown in FIG. 24, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

The multiplexed data to be used is of a stream type included in the PMT. Furthermore, when the multiplexed data is recorded on a recording medium, the video stream attribute information included in the multiplexed data information is used. More specifically, the video coding method or the video coding apparatus described in each of embodiments includes a step or a unit for allocating unique information indicating video data generated by the video coding method or the video coding apparatus in each of embodiments, to the stream type included in the PMT or the video stream attribute information. With the configuration, the video data generated by the video coding method or the video coding apparatus described in each of embodiments can be distinguished from video data that conforms to another standard.

Figure 25:
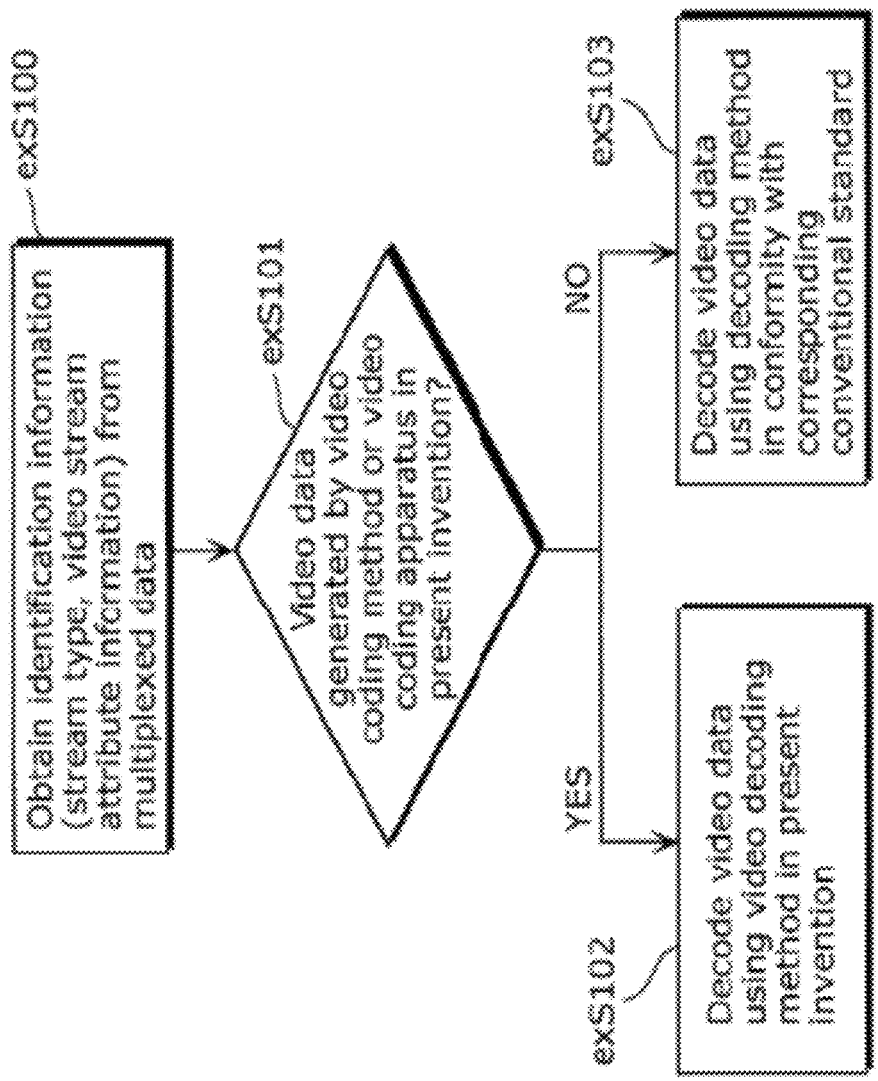
FIG. 25 is a schematic drawing showing steps for identifying video data.

Furthermore, FIG. 25 illustrates steps of the video decoding method. In Step exS100, the stream type included in the PMT or the video stream attribute information is obtained from the multiplexed data. Next, in Step exS101, it is determined whether or not the stream type or the video stream attribute information indicates that the multiplexed data is generated by the video coding method or the video coding apparatus in each of embodiments. When it is determined that the stream type or the video stream attribute information indicates that the multiplexed data is generated by the video coding method or the video coding apparatus in each of embodiments, in Step exS102, decoding is performed by the video decoding method in each of embodiments. Furthermore, when the stream type or the video stream attribute information indicates conformance to the conventional standards, such as MPEG-2, MPEG4-AVC, and VC-1, in Step exS103, decoding is performed by a video decoding method in conformity with the conventional standards.

As such, allocating a new unique value to the stream type or the video stream attribute information enables determination whether or not the video decoding method or the video decoding apparatus that is described in each of embodiments can perform decoding. Even when multiplexed data that conforms to a different standard, an appropriate decoding method or apparatus can be selected. Thus, it becomes possible to decode information without any error. Furthermore, the video coding method or apparatus, or the video decoding method or apparatus can be used in the devices and systems described above.

Figure 26:
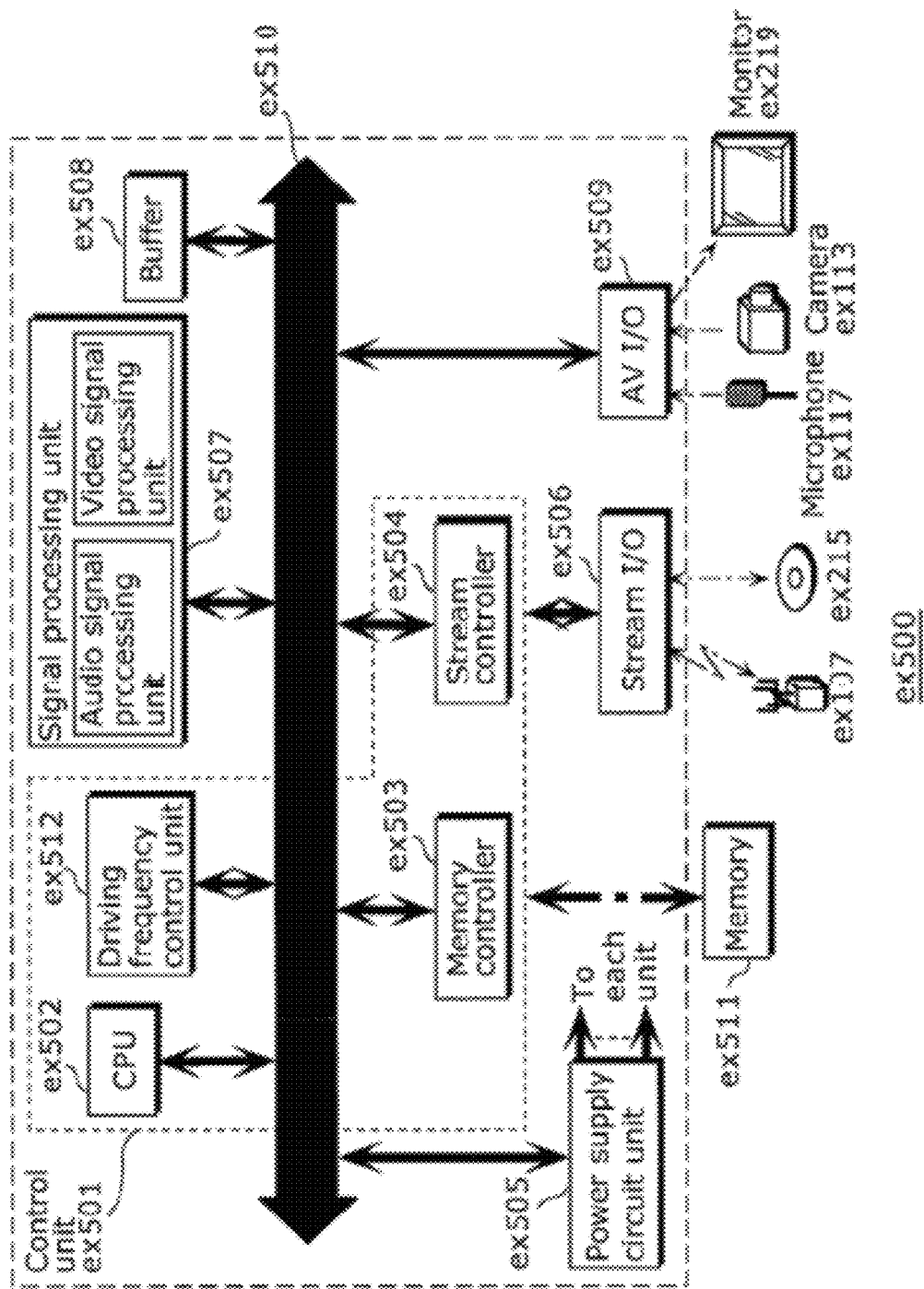
FIG. 26 is a block diagram illustrating an example of a configuration of an integrated circuit for implementing the video coding method and the video decoding method according to each of embodiments.

Each of the video coding method, the video coding apparatus, the video decoding method, and the video decoding apparatus in each of embodiments is typically achieved in the form of an integrated circuit or a Large Scale Integrated (LSI) circuit. As an example of the LSI, FIG. 26 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream 10 ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex510 includes the CPU ex502, the memory controller ex503, the stream controller ex504, the driving frequency control unit ex512, the configuration of the control unit ex510 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

When video data generated in the video coding method or by the video coding apparatus described in each of embodiments is decoded, compared to when video data that conforms to a conventional standard, such as MPEG-2, MPEG4-AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 27:
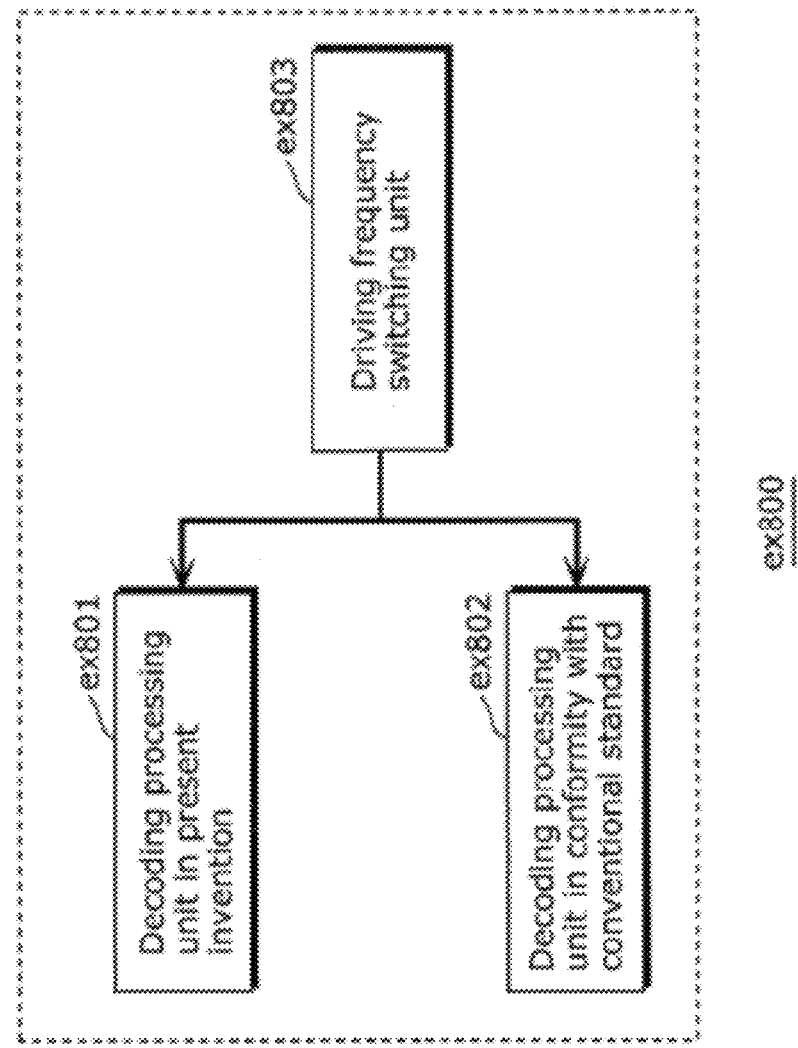
FIG. 27 is a schematic drawing showing a configuration for switching between driving frequencies.

In order to solve the problem, the video decoding apparatus, such as the television ex300 and the LSI ex500 is configured to determine to which standard the video data conforms, and switch between the driving frequencies according to the determined standard. FIG. 27 illustrates a configuration ex800. A driving frequency switching unit ex803 sets a driving frequency to a higher driving frequency when video data is generated by the video coding method or the video coding apparatus described in each of embodiments. Then, the driving frequency switching unit ex803 instructs a decoding processing unit ex801 that executes the video decoding method described in each of embodiments to decode the video data. When the video data conforms to the conventional standard, the driving frequency switching unit ex803 sets a driving frequency to a lower driving frequency than that of the video data generated by the video coding method or the video coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 26. Here, each of the decoding processing unit ex801 that executes the video decoding method described in each of embodiments and the decoding processing unit ex802 that conforms to the conventional standard corresponds to the signal processing unit ex507 in FIG. 26. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described is probably used for identifying the video data. The identification information is not limited to the one described above but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 29. The driving frequency can be selected by storing the look-up table in the buffer ex508 and in an internal memory of an LSI, and with reference to the look-up table by the CPU ex502.

Figure 28:
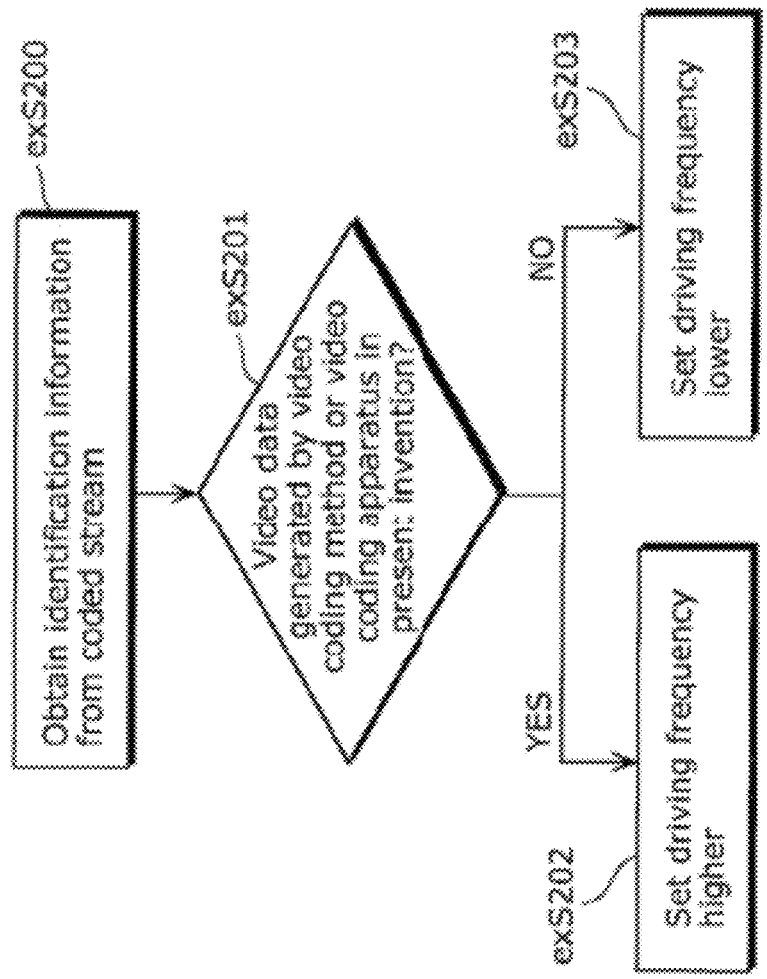
FIG. 28 is a schematic drawing showing steps for identifying video data and switching between driving frequencies.

FIG. 28 illustrates steps for executing a method. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the video coding method and the video coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the video coding method and the video coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG4-AVC is larger than the processing amount for decoding video data generated by the video coding method and the video coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the video coding method and the video coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the video coding method and the video coding apparatus described in each of embodiments, the driving of the CPU ex502 does not probably have to be suspended. When the identification information indicates that the video data conforms to the conventional standard, such as MPEG-2, MPEG4-AVC, and VC-1, the driving of the CPU ex502 is probably suspended at a given time because the CPU ex502 has extra processing capacity. Even when the identification information indicates that the video data is generated by the video coding method and the video coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figures 30A, 30B:
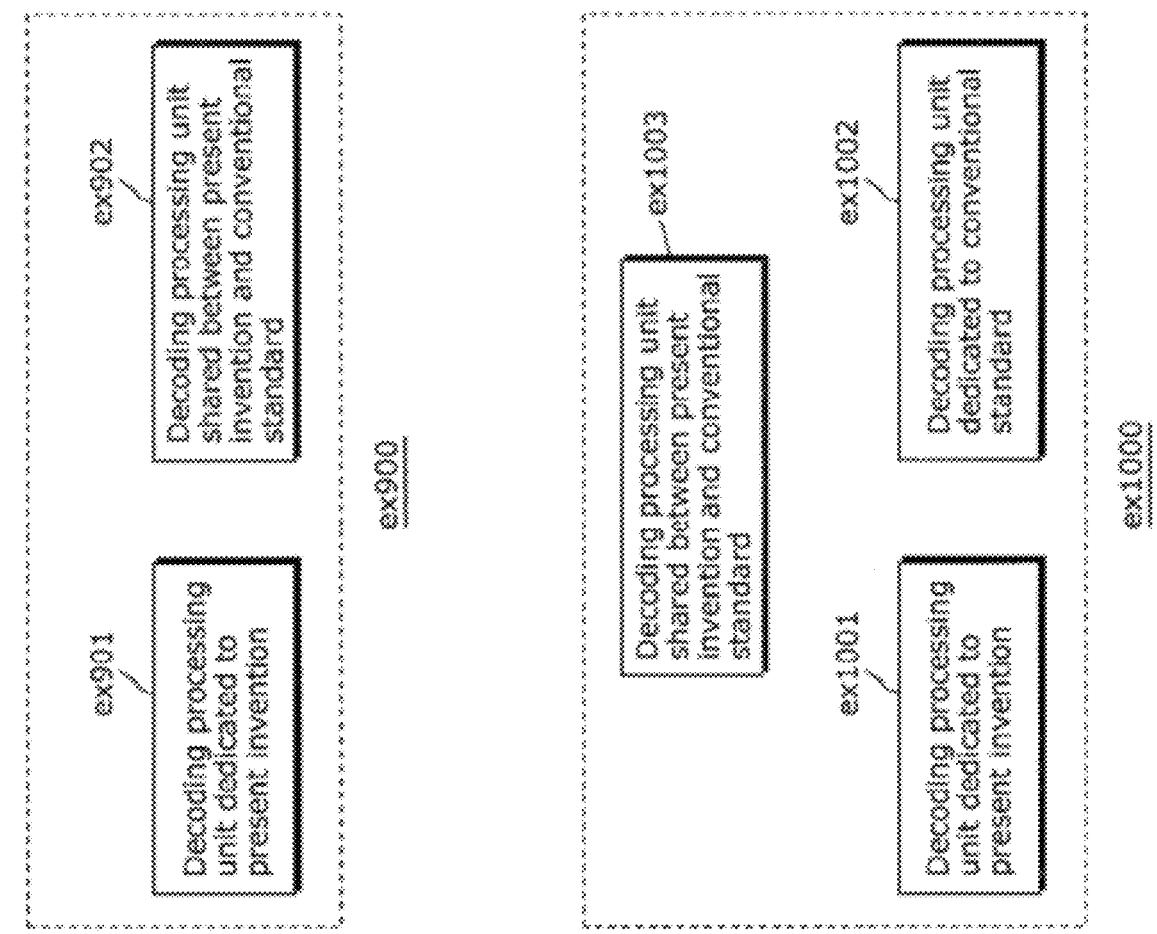
FIG. 30A is a schematic drawing showing an example of a configuration for sharing a module of a signal processing unit.
FIG. 30B is a schematic drawing showing another example of a configuration for sharing a module of a signal processing unit.

In order to solve the problem, what is conceived is a configuration in which the decoding processing unit for implementing the video decoding method described in each of embodiments and the decoding processing unit that conforms to the conventional standard, such as MPEG-2, MPEG4-AVC, and VC-1 are partly shared. Ex900 in FIG. 30A shows an example of the configuration. For example, the video decoding method described in each of embodiments and the video decoding method that conforms to MPEG4-AVC have, partly in common, the details of processing, such as entropy coding, inverse quantization, deblocking filtering, and motion compensated prediction. The details of processing to be shared probably includes use of a decoding processing unit ex902 that conforms to MPEG4-AVC. In contrast, a dedicated decoding processing unit ex901 is probably used for other processing unique to the present invention. Since the present invention is characterized by a spatial prediction, for example, the dedicated decoding processing unit ex901 is used for spatial prediction in accordance with the present invention. Otherwise, the decoding processing unit is probably shared for one of the entropy coding, inverse transformation, inverse quantization, and motion compensated prediction, or all of the processing. The decoding processing unit for implementing the video decoding method described in each of embodiments may be shared for the processing to be shared, and a dedicated decoding processing unit may be used for processing unique to that of MPEG4-AVC.

Furthermore, ex1000 in FIG. 30B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the video decoding method in the present invention and the conventional video decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration can be implemented by the LSI ex500.

As such, reducing the scale of the circuit of an LSI and reducing the cost are possible by sharing the decoding processing unit for the processing to be shared between the video decoding method in the present invention and the video decoding method in conformity with the conventional standard.

In the above description, some examples have been outlined in relation to an H.264/MPEG-4 AVC based video coding system, and the terminology mainly relates to the H.264/AVC terminology. However, this terminology and the description of the various embodiments with respect to H.264/MPEG-4 AVC based coding is not intended to limit the principles and ideas of the invention to such systems. Also the detailed explanations of the encoding and decoding in compliance with the H.264/MPEG-4 AVC standard are intended to better understand the exemplary embodiments described herein and should not be understood as limiting the invention to the described specific implementations of processes and functions in the video coding. Nevertheless, the improvements proposed herein may be readily applied in the video coding described. Furthermore the concept of the invention may be also readily used in the enhancements of H.264/MPEG-4 AVC coding or in the next standard currently discussed by the JCT.

Summarizing, the present invention relates to spatial prediction of pixels of a block, the block being a block of a digital image. In particular, for a block pixel at least one reference pixel(s) is selected and out of the selected reference pixel(s), the block pixel is predicted. In particular, the prediction of the block pixel is performed depending on the distance of this pixel to the reference pixel(s) from which it is to be predicted.

We claim:
1. A video encoding method for use in a video encoder, the video encoding method encoding pixels of an image block in a digital image, the video encoding method comprising:
predicting, using a processor, the pixels of the image block based on reference pixels spatially adjacent to the image block;
encoding a difference between the predicted pixels of the image block and an original image block; and
embedding the encoded difference within a bitstream, wherein said predicting the pixels of the image block includes performing, for each of the pixels of the image block:
    determining, for the pixel of the image block, at least one reference pixel adjacent to the image block;
    determining a spatial distance between the pixel of the image block and the at least one reference pixel, the spatial distance being determined by adding (i) a squared absolute value of a vertical distance between the pixel of the image block and the at least one reference pixel and (ii) a squared absolute value of a horizontal distance between the pixel of the image block and the at least one reference pixel; and
    predicting the pixel of the image block,
wherein in said predicting the pixel of the image block:
    when the determined spatial distance is greater than or equal to a first distance, the pixel is predicted by smoothing the at least one reference pixel with a low-pass filter and using the smoothed at least one reference pixel; and
    when the determined spatial distance is smaller than a second distance that is smaller than the first distance, the pixel is predicted using the at least one reference pixel without smoothing the at least one reference pixel with the low-pass filter; and
    when the determined spatial distance is smaller than the first distance and greater than or equal to the second distance, the pixel is predicted as a weighted sum of (i) information obtained by predicting the pixel using the at least one reference pixel without smoothing the at least one reference pixel with the low-pass filter and (ii) information obtained by predicting the pixel by smoothing the at least one reference pixel with a low-pass filter and using the smoothed at least one reference pixel.

2. The video encoding method according to claim 1, wherein in said predicting the pixel of the image block, when the determined spatial distance is greater than or equal to the first distance, the pixel is predicted by smoothing the at least one reference pixel with the low-pass filter, interpolating at least one sub-pel position from the smoothed at least one reference pixel, and extrapolating the at least one pixel of the image block by copying the at least one interpolated sub-pel position.

3. The video encoding method according to claim 1, wherein weights for the weighted sum are defined for each vertical and/or horizontal component of the spatial distance between the at least one pixel of the image block and the reference pixel used for the prediction of the at least one pixel of the image block.

4. The video encoding method according to claim 3, wherein the weights are organized in a matrix, such that elements of the matrix are proportional to elements of an autocorrelation matrix of pixels of the image block, such that the elements of the matrix are derived based on statistics of images from a training set, or such that the elements of the matrix are either 0 or 1.

5. The video encoding method according to claim 1, wherein said predicting predicts a pixel of the image block from at least one sub-pel position obtained by interpolating at least one reference pixel selected for said predicting of the pixel of the image block, and a type of interpolation filtering is different for at least two pixels in the image block.

6. The video encoding method according to claim 5, wherein the type of interpolation filtering includes at least one of linear filtering, copying the at least one reference pixel, cubic filtering, or Wiener filtering.

7. The video encoding method according to claim 1, wherein said embedding further includes embedding into the bitstream at least one parameter indicating which filter is to be applied for each pixel of the image block, the at least one parameter being:
    a threshold for indicating a distance between a pixel of the image block and a reference pixel used for the prediction of the pixel of the image block up to which a first filtering is applied and starting from which a second filtering is applied, the second filtering being different from the first filtering;
    a plurality of weights for combining prediction using reference pixels filtered according to the first filtering and prediction using reference pixels filtered according to the second filtering, the weights being different for at least two different pixel positions within the block; or
    for each pixel of the image block, an indicator indicating which filtering is to be applied to the pixel.

8. A video decoding for use in a video decoder, the video decoding method decoding pixels of an image block from a bitstream, the video decoding method comprising:
    extracting a block of pixel differences from the bitstream;
    predicting, using a processor, the pixels of the image block based on reference pixels spatially adjacent to the image block; and
    decoding the pixels of the image block by adding the predicted pixels of the image block of pixels to the extracted block of pixel differences,
    wherein said predicting the pixels of the image block includes performing, for each of the pixels of the image block:
        determining, for the pixel of the image block, at least one reference pixel adjacent to the image block;
        determining a spatial distance between the pixel of the image block and the at least one reference pixel, the spatial distance being determined by adding (i) a squared absolute value of a vertical distance between the pixel of the image block and the at least one reference pixel and (ii) a squared absolute value of a horizontal distance between the pixel of the image block and the at least one reference pixel; and
        predicting the pixel of the image block,
    wherein in said predicting the pixel of the image block:
        when the determined spatial distance is greater than or equal to a first distance, the pixel is predicted by smoothing the at least one reference pixel with a low-pass filter and using the smoothed at least one reference pixel; and
        when the determined spatial distance is smaller than a second distance that is smaller than the first distance, the pixel is predicted using the at least one reference pixel without smoothing the at least one reference pixel with the low-pass filter; and
        when the determined spatial distance is smaller than the first distance and greater than or equal to the second distance, the pixel is predicted as a weighted sum of (i) information obtained by predicting the pixel using the at least one reference pixel without smoothing the at least one reference pixel with the low-pass filter and (ii) information obtained by predicting the pixel by smoothing the at least one reference pixel with a low-pass filter and using the smoothed at least one reference pixel.

9. A video encoding apparatus for encoding pixels of an image block in a digital image, the video encoding apparatus comprising:

a processor;

a predictor for, using a processor, predicting the pixels of the image block based on reference pixels spatially adjacent to the image block;

an encoder for encoding a difference between the predicted pixels of the image block and an original image block; and an embedder for embedding the encoded difference within a bitstream, wherein said predictor predicts the pixels of the image block by performing, for each of the pixels of the image block:

determining, for the pixel of the image block, at least one reference pixel adjacent to the image block, using the processor;

determining a spatial distance between the pixel of the image block and the at least one reference pixel, the spatial distance being determined by adding (i) a squared absolute value of a vertical distance between the pixel of the image block and the at least one reference pixel and (ii) a squared absolute value of a horizontal distance between the pixel of the image block and the at least one reference pixel; and predicting the pixel of the image block, wherein when the determined spatial distance is greater than or equal to a first distance, the at least one reference pixel is smoothed with a low-pass filter and said predictor predicts the pixel using the smoothed at least one reference pixel, when the determined spatial distance is smaller than a second distance that is smaller than the first distance, said predictor predicts the pixel using the at least one reference pixel without smoothing the at least one reference pixel with the low-pass filter, and when the determined spatial distance is smaller than the first distance and greater than or equal to the second distance, said predictor predicts the pixel using a weighted sum of (i) information obtained by predicting the pixel using the at least one reference pixel without smoothing the at least one reference pixel with the low-pass filter and (ii) information obtained by predicting the pixel by smoothing the at least one reference pixel with a low-pass filter and using the smoothed at least one reference pixel.

10. The video encoding apparatus according to claim 9, wherein when the determined spatial distance is greater than or equal to a first distance, the at least one reference pixel is smoothed with the low-pass filter, the predictor interpolates at least one sub-pel position from the smoothed at least one reference pixel smoothed, the predictor extrapolates the at least one pixel of the image block by copying the at least one interpolated sub-pel position.

11. The video encoding apparatus according to claim 9, wherein weights for the weighted sum are defined for each vertical and/or horizontal component of the spatial distance between the at least one pixel of the image block and the reference pixel used for the prediction of the at least one pixel of the image block.

12. The video encoding apparatus according to claim 11, wherein the weights are organized in a matrix, such that elements of the matrix are proportional to elements of an autocorrelation matrix of pixels of the image block, such that the elements of the matrix are derived based on statistics of images from a training set, or such that the elements of the matrix are either 0 or 1.

13. The video encoding apparatus according to claim 9, wherein said predictor is configured to predict a pixel of the image block from at least one sub-pel position obtained by interpolating at least one reference pixel selected for the prediction of the pixel of the image block, and a type of interpolation filtering is different for at least two pixels in the image block.

14. The video encoding apparatus according to claim 13, wherein the type of interpolation filtering includes at least one of linear filtering, copying the at least one reference pixel, cubic filtering, or Wiener filtering.

15. The video encoding apparatus according to claim 9, wherein said embedder is further configured to embed into the bitstream at least one parameter indicating which filter is to be applied for each pixel of the image block, the at least one parameter being:

a threshold for indicating a distance between a pixel of the image block and a reference pixel used for the prediction of the pixel of the image block up to which a first filtering is applied and starting from which a second filtering is applied, the second filtering being different from the first filtering;

a plurality of weights for combining prediction using reference pixels filtered according to the first filtering and prediction using reference pixels filtered according to the second filtering, the weights being different for at least two different pixel positions within the block; or for each pixel of the image block, an indicator indicating which filtering is to be applied to the pixel.

16. A video decoding apparatus for decoding pixels of an image block from a bitstream, the video decoding apparatus comprising:

a processor;

an extractor for extracting a block of pixel differences from the bitstream;

a predictor for, using a processor, predicting the pixels of the image block based on reference pixels spatially adjacent to the image block;

a decoder for decoding the pixels of the image block by adding the predicted pixels of the image block to the extracted block of pixel differences, wherein said predictor predicts the pixels of the image block by performing, for each of the pixels of the image block:

determining, for the pixel of the image block, at least one reference pixel adjacent to the image block, using the processor;

determining a spatial distance between the pixel of the image block and the at least one reference pixel, the spatial distance being determined by adding (i) a squared absolute value of a vertical distance between the pixel of the image block and the at least one reference pixel and (ii) a squared absolute value of a horizontal distance between the pixel of the image block and the at least one reference pixel; and predicting the pixel of the image block, wherein when the determined spatial distance is greater than or equal to a first distance, the at least one reference pixel is smoothed with a low-pass filter and said predictor predicts the pixel using the smoothed at least one reference pixel, when the determined spatial distance is smaller than a second distance that is smaller than the first distance, said predictor predicts the pixel using the at least one reference pixel without smoothing the at least one reference pixel with the low-pass filter, and when the determined spatial distance is smaller than the first distance and greater than or equal to the second distance, said predictor predicts the pixel using a weighted sum of (i) information obtained by predicting the pixel using the at least one reference pixel without smoothing the at least one reference pixel with the low-pass filter and (ii) information obtained by predicting the pixel by smoothing the at least one reference pixel with a low-pass filter and using the smoothed at least one reference pixel.

* * * * *